United States Patent [19]

Aoki

[11] Patent Number: 5,473,709
[45] Date of Patent: Dec. 5, 1995

[54] APPARATUS FOR CONVERTING CHARACTER OUTLINE DATA INTO DOT-MATRIX DATA FOR DISPLAY OR PRINTING

[75] Inventor: Kazuma Aoki, Kasugai, Japan

[73] Assignee: Brother Kogyo Kabushiki Kaisha, Nagoya, Japan

[21] Appl. No.: 270,251

[22] Filed: Jul. 5, 1994

[30] Foreign Application Priority Data

Jul. 15, 1993 [JP] Japan .................................... 5-175184

[51] Int. Cl.$^6$ .............................. G06K 9/36; G06F 15/62
[52] U.S. Cl. ......................... 382/258; 382/301; 395/150; 345/128
[58] Field of Search .................................. 382/55, 47, 44, 382/266, 258, 267, 268, 301; 395/151, 150; 345/128, 141, 143

[56] References Cited

U.S. PATENT DOCUMENTS

| | | | |
|---|---|---|---|
| 4,675,830 | 6/1987 | Hawkins | 364/518 |
| 4,897,638 | 1/1990 | Kokunishi et al. | 345/128 |
| 5,050,228 | 9/1991 | Yoshida et al. | 382/55 |
| 5,241,653 | 8/1993 | Collins et al. | 395/151 |
| 5,309,554 | 5/1994 | Ito | 345/128 |
| 5,313,573 | 5/1994 | Takahama | 395/151 |
| 5,319,358 | 6/1994 | Martinez et al. | 395/151 |

Primary Examiner—Leo H. Boudreau
Assistant Examiner—Matthew C. Bella
Attorney, Agent, or Firm—Oliff & Berridge

[57] ABSTRACT

An apparatus for producing dot-matrix data from outline data defining an original outline of an image in an X-Y coordinate system, including a first transforming device transforming, according to transformation data, first interval data defining original intervals regarding the X and/or Y axis, into second interval data defining transformed intervals; a correcting device correcting the second interval data into third interval data defining corrected intervals; a determining device determining, based on the first and third interval data, a transformation function for each of at least one original interval; a second transforming device transforming original or first outline data into second outline data defining a transformed outline, the first outline data including original sets of x and y coordinates defining the original outline, the second outline data including transformed sets of x and y coordinates defining the transformed outline, the second transforming device transforming the x and/or y coordinate of at least one original set of x and y coordinates within each of at least one original interval, into the x and/or y coordinate of at least one transformed set of x and y coordinates within a corresponding one of the corrected intervals, according to the transformation function for the each original interval; and a producing device producing the dot-matrix data from the second outline data.

20 Claims, 20 Drawing Sheets

| OUTLINE DATA | | | | | | | | | | | | | | | | | | | | | |
|---|---|---|---|---|---|---|---|---|---|---|---|---|---|---|---|---|---|---|---|---|---|
| NUMBER OF POINTS | 20 | | | | | | | | | | | | | | | | | | | | |
| NUMBER OF OUTLINES | 1 | | | | | | | | | | | | | | | | | | | | |
| X COORDINATES | | x0 | x1 | x2 | x3 | x4 | x5 | x6 | x7 | x8 | x9 | x10 | x11 | x12 | x13 | x14 | x15 | x16 | x17 | x18 | x19 |
| Y COORDINATES | | y0 | y1 | y2 | y3 | y4 | y5 | y6 | y7 | y8 | y9 | y10 | y11 | y12 | y13 | y14 | y15 | y16 | y17 | y18 | y19 |
| SORTS OF POINT | | L | L | L | A | A | B | A | A | B | L | L | L | A | A | B | A | A | B | L | L |
| END POINT | | 0 | 0 | 0 | 0 | 0 | 0 | 0 | 0 | 0 | 0 | 0 | 0 | 0 | 0 | 0 | 0 | 0 | 0 | 0 | 1 |

FIG. 4(a)

| | | | |
|---|---|---|---|
| X MINIMUM & MAXIMUM COORDINATES | NUMBER | 2 | |
| | DATA | Xmin | Xmax |
| Y MINIMUM & MAXIMUM COORDINATES | NUMBER | 2 | |
| | DATA | Ymin | Ymax |
| BASE LINES | NUMBER | 2 | |
| | DATA | ky0 | ky1 |
| X LINE SPACINGS | NUMBER | 2 | |
| | DATA | wxl0 | wxl1 |
| | | wxh0 | wxh1 |
| Y LINE SPACINGS | NUMBER | 0 | |
| | DATA | | |
| HINT DATA | | | |

| NUMBER | SORTS OF DATA | ORIGINAL COORDINATES | TARGET COORDINATES | CORRECTED COORDINATES | a | b |
|---|---|---|---|---|---|---|
| 0 | POSITION DATA 0 | Xmin | | | | |
| 1 | POSITION DATA 1 | Xmax | | | | |
| 2 | SPACING DATA 0 | wxl0 | | | | |
| 3 | SPACING DATA 0 | wxh0 | | | | |
| 4 | SPACING DATA 1 | wxl1 | | | | |
| 5 | SPACING DATA 1 | wxh1 | | | | |

FIG. 8

| NUMBER | SORTS OF DATA | ORIGINAL COORDINATES | TARGET COORDINATES | CORRECTED COORDINATES | a | b |
|---|---|---|---|---|---|---|
| 0 | POSITION DATA 0 | Xmin | TXmin | | | |
| 1 | POSITION DATA 1 | Xmax | TXmax | | | |
| 2 | SPACING DATA 0 | wxl0 | Twxl0 | | | |
| 3 | SPACING DATA 0 | wxh0 | Twxh0 | | | |
| 4 | SPACING DATA 1 | wxl1 | Twxl1 | | | |
| 5 | SPACING DATA 1 | wxh1 | Twxh1 | | | |

FIG. 9

| NUMBER | SORTS OF DATA | ORIGINAL COORDINATES | TARGET COORDINATES | CORRECTED COORDINATES | a | b |
|---|---|---|---|---|---|---|
| 0 | POSITION DATA 0 | Xmin | TXmin | HTXmin | | |
| 1 | POSITION DATA 1 | Xmax | TXmax | HTXmax | | |
| 2 | SPACING DATA 0 | wxl0 | Twxl0 | HTwxl0 | | |
| 3 | SPACING DATA 0 | wxh0 | Twxh0 | HTwxh0 | | |
| 4 | SPACING DATA 1 | wxl1 | Twxl1 | HTwxl1 | | |
| 5 | SPACING DATA 1 | wxh1 | Twxh1 | HTwxh1 | | |

FIG. 10

| NUMBER | SORTS OF DATA | ORIGINAL COORDINATES | TARGET COORDINATES | CORRECTED COORDINATES | a | b |
|---|---|---|---|---|---|---|
| 0 | POSITION DATA 0 | Xmin | TXmin | HTXmin | | |
| 1 | SPACING DATA 0 | wxl0 | Twxl0 | HTwxl0 | | |
| 2 | SPACING DATA 0 | wxh0 | Twxh0 | HTwxh0 | | |
| 3 | SPACING DATA 1 | wxl1 | Twxl1 | HTwxl1 | | |
| 4 | SPACING DATA 1 | wxh1 | Twxh1 | HTwxh1 | | |
| 5 | POSITION DATA 1 | Xmax | TXmax | HTXmax | | |
| 6 | — | — | — | — | | |

FIG. 11

| NUMBER | SORTS OF DATA | ORIGINAL COORDINATES | TARGET COORDINATES | CORRECTED COORDINATES | a | b |
|---|---|---|---|---|---|---|
| 0 | POSITION DATA 0 | Xmin | TXmin | HTXmin | a0 | b0 |
| 1 | SPACING DATA 0 | wxl0 | Twxl0 | HTwxl0 | a1 | b1 |
| 2 | SPACING DATA 0 | wxh0 | Twxh0 | HTwxh0 | a2 | b2 |
| 3 | SPACING DATA 1 | wxl1 | Twxl1 | HTwxl1 | a3 | b3 |
| 4 | SPACING DATA 1 | wxh1 | Twxh1 | HTwxh1 | a4 | b4 |
| 5 | POSITION DATA 1 | Xmax | TXmax | HTXmax | a5 | b5 |
| 6 | — | — | — | — | a6 | b6 |

ABCDEFGHIJK } FIG. 15(a)

ABCDEFGHIJK } FIG. 15(b)

ABCDEFGHIJK } FIG. 15(c)

APPARATUS FOR CONVERTING CHARACTER OUTLINE DATA INTO DOT-MATRIX DATA FOR DISPLAY OR PRINTING

BACKGROUND OF THE INVENTION

1. Field of the Invention

The present invention relates to an apparatus for producing dot data or dot-matrix data from outline data defining one or more outlines of an image such as a character.

2. Related Art Statement

There is known a data processing device which processes outline data including a plurality of sets of point data, i.e., sets of x and y coordinates which cooperate with each other to define, in the x-y coordinate system, one or more outlines of an image such as a character (e.g., letter, numeral, symbol, figure, etc.). The data processing device produces dot-matrix data from the outline data, so that an output device such as a printer or a display outputs the image according to the dot-matrix data. The dot-matrix data include (a) a plurality of sets of "ON" data (or "OFF" data) defining the inside area of the output image and (b) a plurality of sets of "OFF" data (or "ON" data) defining the outside area of the output image. Each set of "ON" or "OFF" data corresponds to a unit area of the x-y coordinate system or plane, on one hand, and corresponds to a picture element of the output image, on the other hand.

The process of producing dot-matrix data from outline data may easily be understood by assuming a picture-element screen 31, as shown in FIG. 16, which conceptionally defines the picture elements of an output image to be produced by the output device. The picture-element screen 31 is constructed by (a) a number of straight lines extending parallel to a Y axis and passing through respective integral coordinates of an X axis which is perpendicular to the Y axis and cooperates with the Y axis to provide a two-dimensional coordinate system, and (b) a number of straight lines extending parallel to the X axis and passing through respective integral coordinates of the Y axis. In this case, each picture element of the output image corresponds to a square unit area defined by (a) two adjacent straight lines parallel to the Y axis and (b) two adjacent straight lines parallel to the X axis, and those four straight lines provide the four boundary lines of the square unit area.

A raster-scanning method using a picture-element screen is widely used for producing dot-matrix data from outline data. This method will be described in detail by reference to the outline data of a character "n" shown in FIG. 2. First, the outline data, or outline defined thereby are assumed to be superposed on the picture-element screen. Next, a single straight scanning line is assumed to extend parallel to the X or Y axis and pass over the centers of square unit areas of the picture-element screen, i.e., picture elements of the output image. Subsequently, all the intersecting point or points of the scanning line and the character outline is/are determined. Based on the position or positions of the intersecting point or points, a set of "ON" or "OFF" data is given to each of the square unit areas currently under the scanning line, according to a predetermined rule, so that one or more sets of "ON" data substantially define the inside area of the character outline and one or more sets of "OFF" data substantially define the outside area of the character outline. Thus, one row or one column of the dot-matrix data is produced. By repeating this operation moving the scanning line all over the picture-element screen, the entire dot-matrix data are produced for the character as a whole. In this way, the dot-matrix data are produced from the outline data.

Alternatively, after the original or first outline data are transformed into second outline data defining a transformed outline having a changed size, the second outline data may be converted into dot-matrix data in the same manner as described above. In this case, it is possible to obtain various sizes of transformed outlines or images from a single set of original outline data. The process of changing the size of an outline or image defined by outline data will be described by reference to the outline data of character "n" of FIG. 2. This process may be performed by transforming the sets of point data, i.e., sets of x and y coordinates of the outline data in such a way that each picture element of an output image corresponds to a square unit area whose four vertices are defined by two adjacent transformed x integral coordinates and two adjacent transformed y integral coordinates. Assuming that a desired size of the output image be selected at a value, p (points; p=1 is equal to 1/72 inch), by an operator or user through an input device such as a keyboard, that the resolution of the output device be specified at a value, d (dots per inch), and that the original size of the image be defined at a value, e, by the original outline data, then a transformation coefficient, Z, for the above coordinate transformation is obtained by the following expression:

$$Z=(p\times d)/(I\times e)$$

where I is a constant, i.e., 72 (points per inch).

Additionally, the operator may input, through the input device, data indicative of a desired position of the output image, i.e., parallel-translation amount of the image with respect to the X and/or Y axis. Therefore, this coordinate transformation is generally expressed by the following transformation function, i.e., linear function:

$$v'=Z\times v+T$$

where Z is the transformation coefficient with respect to the X and/or Y axis;

T is the parallel-translation amount with respect to the X and/or Y axis;

v is each of the x and/or y coordinates of the original outline data; and v' is a corresponding one of the x and/or y coordinates of the transformed outline data.

Hereinafter, the original outline data are referred to as the "outline data A" and the transformed outline data are referred to as the "outline data B".

If the outline data B are superposed on a picture-element screen 31 as shown in FIG. 16 and subsequently the outline data B are subjected to the raster-scanning method to produce dot-matrix data, the dot-matrix data produced may suffer from low quality because quantization errors may occur when the outline data B are converted into the dot-matrix data. FIG. 16 shows the dot-matrix data including the sets of "ON" data (indicated by hatching) produced from the outline data B by the raster-scanning method. As can been seen from the figure, vertical parts 33, 34 of the dot-matrix data have different widths whereas the counter parts of the outline data B have the same width. Thus, the dot image, i.e., output image may give a strange impression to observers.

For solving the above problem, it has been practiced to automatically adjust the position and width of a vertical or horizontal part of a transformed image, and thereby control the number of picture elements to be located between the two opposite outline portions of the vertical or horizontal part. One of the known methods will be described below.

First, line-spacing data are prepared which include (a) position data including two x or y coordinates defining a vertical or horizontal part to be adjusted and (b) spacing data defining the distance between the two coordinates. Thus, the line-spacing data define the width of the vertical or horizontal part. More specifically, a set of x line-spacing data for a vertical part includes (a) x position data including two x coordinates and (b) x spacing data defining the difference or distance between the two x coordinates. Similarly, a set of y line-spacing data for a horizontal part includes (c) y position data including two y coordinates and (d) y spacing data defining the difference or distance between the two y coordinates. FIG. 2 shows the outline data A of character "n" for which two sets of x line-spacing data are included for two vertical parts 20, 21 of the character "n".

Second, the line-spacing data are transformed according to a desired size of the output image. Regarding the character "n" of FIG. 2, the two x coordinates of each of the two sets of x line-spacing data 20, 21 are transformed by the same manner as used for the transformation of the outline data A into the outline data B, and the distance or width defined by the x spacing data of each set of x line-spacing data 20, 21 is multiplied by the transformation coefficient Z, and then is rounded by counting fractions of 0.5 and over as one and cutting away the rest, or otherwise cutting away fractions smaller than one. The thus obtained width will be referred to as the "dot width". The dot width just corresponds to an integral number of dots, i.e., picture elements of the output image. FIG. 16 shows the transformed sets of x line-spacing data 35, 36 respectively corresponding to the original sets of x line-spacing data 20, 21.

Third, one of the two transformed x coordinates of each transformed set of x line-spacing data 35, 36 which one coordinate has a smaller distance up to an x integral coordinate nearest thereto than that of the other transformed coordinate, is selected as a base coordinate, and the other transformed coordinate is selected as a dependent coordinate. The base coordinate is moved, i.e., rounded to that integral coordinate nearest thereto, which provides a corrected base coordinate. Otherwise, a smaller one of the two transformed coordinates may be selected as a base coordinate and be rounded to an integral coordinate as a corrected base coordinate by cutting away fractions smaller than one. Then, the dependent coordinate is moved to an integral x coordinate, i.e., corrected dependent coordinate, distant from the corrected base coordinate by the dot width. Subsequently, all the x coordinates of the outline data B equal to the base coordinate are corrected or moved to the corrected base coordinate, and all the x coordinates of the outline data B equal to the dependent coordinate are corrected or moved to the corrected dependent coordinate.

FIG. 17 shows outline data C obtained by correcting the outline data B as described above. The two sets of x line-spacing data 35, 36 of FIG. 16 are corrected to two sets of x line-spacing data 413, 414 of FIG. 17, respectively. In FIG. 17, black circles 40, 41, 42, 43, 44, 45, and 46 indicate the x coordinates corrected based on the transformed and corrected x line-spacing data 35, 413, and black circles 47, 48, 49, 410, 411, and 412 indicate the x coordinates corrected based on the transformed and corrected x line-spacing data 36, 414. The outline data C are converted into dot-matrix data indicated by hatching in FIG. 17 wherein the vertical parts 33, 34 of the dot-matrix data have the same width. Thus, the dot-matrix data enjoy high quality.

In short, the outline data A are first subjected to size changing to provide the outline data B, which in turn are subjected to correction of quantization errors to provide the outline data C, which in turn are subjected to the raster-scanning method using the picture-element screen 31 to provide the dot-matrix data.

In the above conventional process, however, it is not necessary, but actually is carried out, to transform the original x coordinates (indicated by black circles in FIG. 2) of the outline data A which are to be corrected when the outline data B are corrected to the outline data C, because those original x coordinates can be corrected without utilizing the corresponding transformed x coordinates of the outline data B. This applies to the original y coordinates to be corrected, if any. This problem leads to increasing the production cost of the dot-matrix data and lowering the production efficiency of the dot-matrix data.

SUMMARY OF THE INVENTION

It is therefore an object of the present invention to provide an apparatus which produces dot-matrix data with high quality from outline data with high production efficiency.

The above object has been achieved by the present invention, which provides an apparatus for producing dot-matrix data from outline data defining at least one original outline of an image in a two-dimensional coordinate system provided by an X axis and a Y axis perpendicular to each other, comprising: first transforming means for transforming, according to transformation data, first interval data defining a plurality of original intervals with respect to at least one of the X axis and the Y axis, into second interval data defining a plurality of transformed intervals with respect to the at least one of the X axis and the Y axis; correcting means for correcting, according to a first predetermined rule, the second interval data into third interval data defining a plurality of corrected intervals with respect to the at least one of the X axis and the Y axis; transformation-function determining means for determining, based on the first interval data and the third interval data, a transformation function for each of at least one of the original intervals defined with respect to the at least one of the X axis and the Y axis; second transforming means for transforming first outline data as the above-indicated outline data, into second outline data defining at least one transformed outline of the image, the first outline data comprising a plurality of original sets of x and y coordinates which cooperate with each other to define the original outline of the image, the second outline data comprising a plurality of transformed sets of x and y coordinates which cooperate with each other to define the transformed outline of the image, the second transforming means transforming at least one of (a) an x coordinate and (b) a y coordinate of at least one original set of x and y coordinates within the each of the at least one of the original intervals defined with respect to the at least one of (a) the X axis and (b) the Y axis, into at least one of (a) an x coordinate and (b) a y coordinate of at least one transformed set of x and y coordinates within a corresponding one of the corrected intervals, according to the transformation function determined for the each original interval; and dot-matrix data producing means for producing the dot-matrix data from the second outline data according to a second predetermined rule, the dot-matrix data comprising a plurality of sets of inside data substantially defining an inside area of the transformed outline of the image defined by the second outline data, and a plurality of sets of outside data substantially defining an outside area of the transformed outline of the image. The original interval data define a plurality of original intervals with respect to each of the X and Y axes of the x-y coordinate system in which the original outline of the character is defined by the original outline data. This data contains (a) one or more sets of position data each set of which includes a single x (or y) coordinate, and (b) one or more sets of spacing data each set of which includes a pair of x (or y) coordinates. A set of position data is used for positional alignment of a character with respect to the X (or Y) axis and a set of spacing data is used for adjusting the number of square unit area or areas (i.e., picture element or elements) to be located between a pair of transformed x (or y) coordinates. This information comprises hint data which will be described in detail.

In the dot-matrix data producing apparatus constructed as described above, the first transforming means transforms the first interval data defining a plurality of original intervals, into second interval data defining a plurality of transformed intervals, the correcting means corrects the second interval data into third interval data defining a plurality of corrected intervals, and the transformation-function determining means determines, based on the first and third boundary data, a transformation function for each of the original intervals. The correction of the second interval data to the third interval data is effected for compensating for quantization errors that has possibly been introduced into the second interval data. The second transforming means transforms the x and/or y coordinate of at least one original set of x and y coordinates within each of the original intervals, into the x and/or y coordinate of at least one transformed set of x and y coordinates within a corresponding one of the corrected intervals, according to the transformation function determined for each original interval. Thus, the x and/or y coordinates of the transformed sets of x and y coordinates of the second outline data are free from the quantization errors, therefore the second outline data enjoy excellent quality. Additionally, the first transforming means does not transform all the original x and/or y coordinates that need the quantization-error correction. Thus, the present apparatus enjoys improved production efficiency of the dot-matrix data. Furthermore, since the transformation function is determined for each of the original intervals, the second outline data are free from the problem that visual balance or smoothness of the image may be lost at the transition or transitions from one interval to its adjacent interval or intervals.

According to a preferred feature of the present invention, the dot-matrix data producing apparatus further comprises an output device which outputs the image according to the dot-matrix data. The output device may be a printing device, such as a laser printer, or a displaying device, such as a liquid-crystal display. The printing device may record, on a recording medium, the image according to the dot-matrix data comprising the sets of inside data and the sets of outside data each set of which corresponds to a picture element of the image to be recorded on the recording medium. Each set of inside data may indicate the presence of an image and each set of outside data may indicate the absence of the image, or vice versa.

According to another feature of the present invention, the apparatus further comprises an original-data memory which stores at least one of the first outline data and the first interval data, the first outline data defining at least one original outline of a character as the image, the original sets of x and y coordinates of the first outline data comprising at least one of (a) a set of x and y coordinates defining an end point of a straight line as a portion of the original outline, and (b) a plurality of sets of x and y coordinates defining at least one control point and an end point of a Bezier curve as a portion of the original outline. In the case where the original outline of the image consists of a plurality of straight lines connected to each other, one of the two end points of each of the connected straight lines defines one of the two end points of the preceding or following straight line. In the case where the original outline consists of a plurality of Bezier curves connected to each other, one of the two end points of each of the Bezier curves defines one of the two end points of the preceding or following Bezier curve. In the case where a Bezier curve is defined by a quadratic Bezier function, the Bezier curve has a single control point; and in the case where a Bezier curve is defined by a cubic Bezier function, the Bezier curve has two control points.

According to yet another feature of the present invention, the apparatus further comprises an input device which is operable for inputting at least one of (a) the transformation data and (b) at least one character code corresponding to at least one set of character data as the first outline data and the first interval data for at least one character as the image. In this case, the apparatus may further comprise a parameter memory which stores the at least one of (a) the transformation data and (b) the at least one character code, the transformation data comprising at least one of (a1) size-related data relating to a size of the image with respect to the at least one of the X axis and the Y axis and (a2) a translation value indicative of a parallel-translation amount of the image with respect to the at least one of the X axis and the Y axis. The size-related data may comprise a size value indicative of the size of the image with respect to the at least one of the X axis and the Y axis. The size value may be a point number, p (points; p=1 is equal to $1/72$ inch). Otherwise, the size-related data may be a reduction or magnification factor (e.g., $1/2$, 2).

According to a further feature of the present invention, the first interval data comprise at least one of (a) x position data including one original x coordinate out of the original sets of x and y coordinates, (b) x spacing data including two original x coordinates out of the original sets of x and y coordinates, (c) y position data including one original y coordinate out of the original sets of x and y coordinates, and (d) y spacing data including two original y coordinates out of the original sets of x and y coordinates.

According to another feature of the present invention, the first transforming means comprises linear transformation means for transforming at least one, v, of (a) the one original x coordinate as the x position data, (b) the two original x coordinates as the x spacing data, (c) the one original y coordinate as the y position data, and (d) the two original y coordinates as the y spacing data, of the first interval data, into the second interval data comprising at least one, v', of (a) one transformed x coordinate corresponding to the one original x coordinate, (b) two transformed x coordinates corresponding to the two original x coordinates, (c) one transformed y coordinate corresponding to the one original y coordinate, and (d) two transformed y coordinates corresponding to the two original y coordinates, according to a linear function, $v'=Z\times v+T$, defined by the transformation data comprising a transformation coefficient, Z, with respect to the at least one of the X axis and the Y axis and a constant, T, with respect to the at least one of the X axis and the Y axis.

According to yet another feature of the present invention, the linear transformation means transforms the first interval data into the second interval data according to the linear function, $v'=Z\times v+T$, with respect to each of (a) the X axis and (b) the Y axis, such that the transformation coefficient Z is defined by a following expression:

$$Z=(p\times d)/(l\times e)$$

where p is a desired size value of the image input through an input device;

d is a resolution of the image defined by the dot-matrix data;

e is an original size value of the image defined by the first outline data; and

I is a constant, so that each of the sets of inside data and the sets of outside data of the dot-matrix data corresponds to a square unit area whose four vertices are defined by two adjacent transformed x integral coordinates, x and x+1, and two adjacent transformed y integral coordinates, y and y+1.

According to a further feature of the present invention, the correcting means comprises rounding means for correcting at least one of (a) the one transformed x coordinate and (c) the one transformed y coordinate, of the second interval data, into the third interval data comprising at least one of (a) one corrected x coordinate corresponding to the one transformed x coordinate and (c) one corrected y coordinate corresponding to the one transformed y coordinate, according to the first predetermined rule wherein each of the at least one of (a) the one transformed x coordinate and (c) the one transformed y coordinate is rounded, according to a predetermined rounding rule, to one of a number of reference coordinates equidistant from one another by a unit distance with respect to a corresponding one of the at least one of the X axis and the Y axis, the one reference coordinate providing a corresponding one of (a) the one corrected x coordinate and (c) the one corrected y coordinate. In this case, the rounding means may round, according to the predetermined rounding rule, each of the at least one of (a) the one transformed x coordinate and (c) the one transformed y coordinate, to one nearest thereto of the reference coordinates. Otherwise, the rounding means may round a transformed x or y coordinate to one of the reference coordinates by cutting away fractions smaller than the unit distance, or counting fractions smaller than the unit distance as one unit distance.

According to another feature of the present invention, the correcting means comprises rounding and changing means for correcting at least one of (b) the two transformed x coordinates and (d) the two transformed y coordinates, of the second interval data, into the third interval data comprising at least one of (b) two corrected x coordinates corresponding to the two transformed x coordinates and (d) two corrected y coordinates corresponding to the two transformed y coordinates, according to the first predetermined rule wherein one of the two transformed coordinates of each of the at least one of (b) the two transformed x coordinates and (d) the two transformed y coordinates which one transformed coordinate satisfies a predetermined rounding condition regarding one of a number of reference coordinates equidistant from one another by a unit distance with respect to a corresponding one of the at least one of the X axis and the Y axis, is rounded to the one reference coordinate as a first reference coordinate and wherein the other of the two transformed coordinates is changed to a second reference coordinate by a rounded distance of the two transformed coordinates, the rounded distance corresponding to an integral number of the unit distances, the first and second reference coordinates providing the two corrected coordinates corresponding to the two transformed coordinates, respectively. In this case, the rounding and changing means may round the one of the two transformed coordinates which satisfies the predetermined rounding condition that the one transformed coordinate has a smaller distance up to one nearest thereto of the reference coordinates than that of the other of the two transformed coordinates. Otherwise, the rounding and changing means may round a smaller or greater one of the two transformed x or y coordinates to one of the reference coordinates by cutting away fractions smaller than the unit distance, or counting fractions smaller than the unit distance as one unit distance.

According to yet another feature of the present invention, the correcting means comprises means for correcting, according to the first predetermined rule, at least one of (a) the one transformed x coordinate, (b) the two transformed x coordinates, (c) the one transformed y coordinate, and (d) the two transformed y coordinates, each of the second interval data, into the third interval data comprising at least one of (a) one corrected x coordinate corresponding to the one transformed x coordinate, (b) two corrected x coordinates corresponding to the two transformed x coordinates, (c) one corrected y coordinate corresponding to the one transformed y coordinate, and (d) two corrected y coordinates corresponding to the two transformed y coordinates.

According to a further feature of the present invention, the transformation-function determining means comprises means for determining, as the transformation function for the each of the at least one of the original intervals defined with respect to the at least one of the X axis and the Y axis, a linear function, v'=a×v+b, wherein, when the each original interval has two opposite ends respectively defined by two adjacent original coordinates, p and q, out of (a) at least one original x coordinate as the x position data, (b) at least one pair of original x coordinates as the x spacing data, (c) at least one original y coordinate as the y position data, and (d) at least one pair of original y coordinates as the y spacing data, the constants a, b of the linear function are as follows:

$$a=(q'-p')/(q-p)$$

$$b=(p'\times q-q'\times p)/(q-p)$$

where p' and q' are the two corrected coordinates corresponding to the two original coordinates p, q, respectively. and wherein, when the each original interval has only one end defined by one, p, of a greatest and a smallest original coordinate out of (a) the at least one original x coordinate, (b) the at least one pair of original x coordinates, (c) the at least one original y coordinate, and (d) the at least one pair of original y coordinates, the constants a, b of the linear function are as follows:

$$a=Z$$

$$b=p'-p\times Z$$

where

Z is a transformation coefficient with respect to the at least one of the X axis and the Y axis, the transformation data comprising the transformation coefficient; and p' is the corrected coordinate corresponding to the one original coordinate p.

According to another feature of the present invention, the dot-matrix data producing means comprises means for producing the dot-matrix data from the second outline data according to the second predetermined rule wherein, when a center of each of a number of rectangular unit areas each of which is defined by (a) adjacent two of a number of reference x coordinates equidistant from one other by a first unit distance with respect to the X axis and (b) by adjacent two of a number of reference y coordinates equidistant from one other by a second unit distance with respect to the Y axis, falls inside the transformed outline of the image defined by the second outline data, the each rectangular unit area is defined by one set of inside data and, when not, the each rectangular unit area is defined by one set of outside data, the first unit distance being equal to a distance between two transformed x integral coordinates, the second unit distance being equal to a distance between two transformed y integral coordinates. The first and second unit distances may be different from, or equal to, each other. In the case where the first and second unit distances are equal to each other, the rectangular unit area becomes a square area. Other known methods may be employed for converting the second outline data to the dot-matrix data.

According to another feature of the present invention, the dot-matrix data producing apparatus further comprises a transformation-function memory which stores the transformation function determined by the transformation-function determining means for each of the original intervals defined with respect to the at least one of the X axis and the Y axis, wherein after the transformation-function determining means determines the transformation function for the each of the original intervals and the transformation-function memory stores the transformation function determined for each of the original intervals, the second transforming means transforms the at least one of (a) the x coordinate and (b) the y coordinate of at least one original set of x and y coordinates within the each of the original intervals, into the at least one of (a) the x coordinate and (b) the y coordinate of at least one transformed set of x and y coordinates within the corresponding one of the corrected intervals, according to transformation function determined for the each of the original intervals and stored in the transformation-function memory.

According to yet another feature of the present invention, the dot-matrix data producing apparatus further comprises: a transformation-function memory which stores the transformation determined by the transformation-function determining means for each of the at least one of the original intervals defined with respect to the at least one of the X axis and the Y axis; and judging means for judging, for each of at least one of (a) an x coordinate and (b) a y coordinate of each of the original sets of x and y coordinates, whether the transformation-function memory stores the transformation function determined for one of the original intervals within which interval each of the at least one of (a) the x coordinate and (b) the y coordinate falls, wherein when the judging means makes a negative judgment the transformation-function determining means determines the transformation function for the one of the original intervals within which interval each of the at least one of (a) the x coordinate and (b) the y coordinate falls and the transformation-function memory stores the transformation function determined for the one of the original intervals, and when the judging means makes a positive judgment the second transforming means transforms each of the at least one of (a) the x coordinate and (b) the y coordinate according to the transformation function determined for the one of the original intervals and stored in the transformation-function memory.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which:

FIG. 4(a) is a table for explaining the outline data of character "n" stored in a character-data ROM 53 of the control circuit of FIG. 1;

FIG. 4(b) is a table for explaining hint data for the character "n" stored in the character-data ROM 53;

FIG. 7 is a table for explaining the first step of the transformation-table production;

FIG. 8 is a table for explaining the second step of the transformation-table production;

FIG. 9 is a table for explaining the third step of the transformation-table production;

FIG. 10 is a table for explaining the fourth step of the transformation-table production;

FIG. 11 is a table for explaining the final step of the transformation-table production;

FIG. 15(a) is a view of characters as an output image;

FIG. 15(b) is a view of upper halves of characters of FIG. 15(b) each half of which is an output image;

FIG. 15(c) is a view of lower halves of characters of FIG. 15(b) each half of which is an output image;

DETAILED DESCRIPTION OF THE PREFERRED EMBODIMENTS

Figure 1:
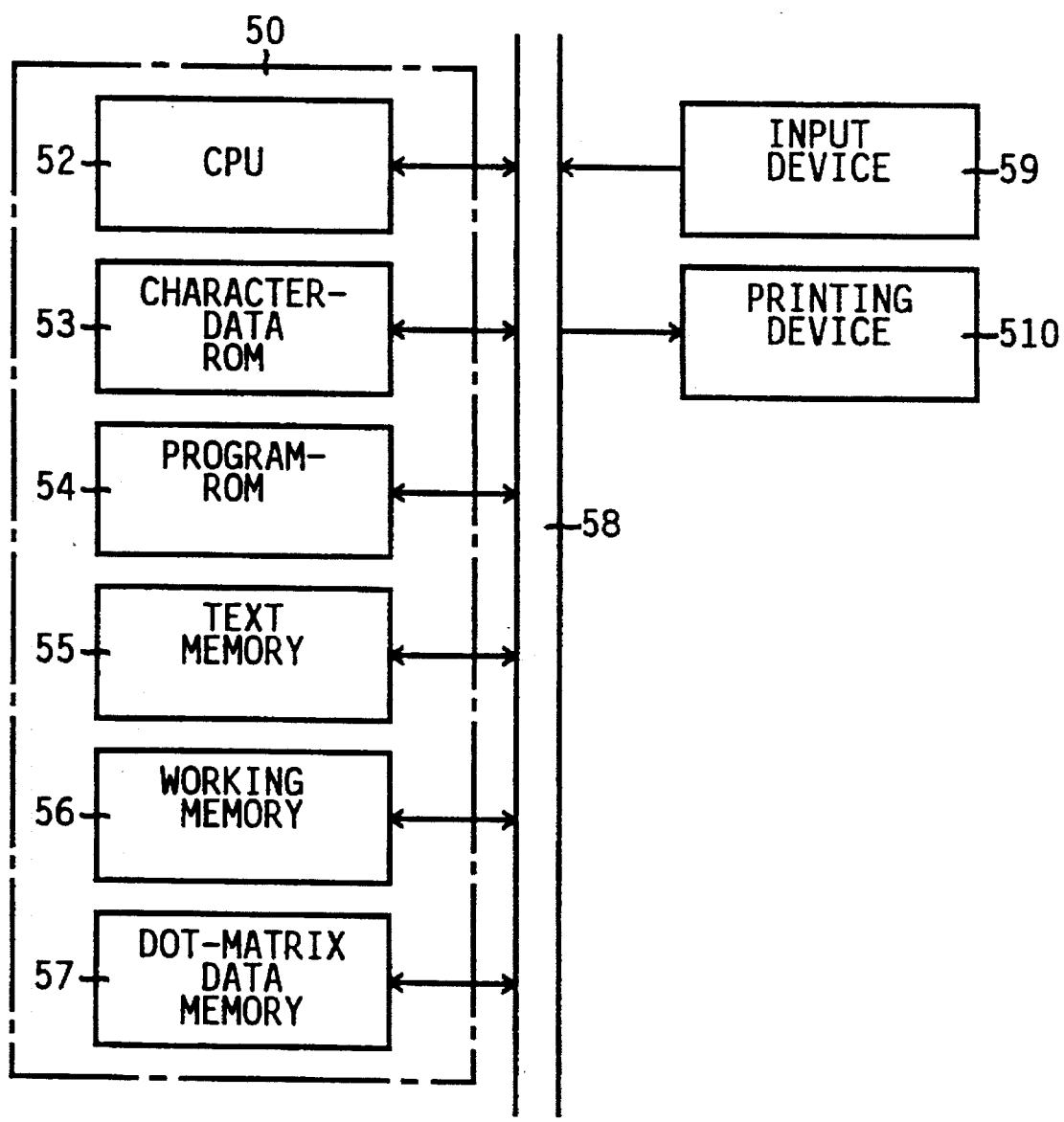
FIG. 1 is a diagrammatic view of a control circuit of a laser printer to which the present invention is applied.

Referring first to FIG. 1, there is shown a control circuit of a laser printer to which the present invention is applied.

The control circuit is essentially constituted by a microcomputer 50 including a central processing unit (CPU) 52, a character-data read only memory (ROM) 53, a program ROM 54, a text memory 55, a working memory 56, and a dot-matrix data memory 57. The elements 52 to 57 are connected to each other via bus 58. The laser printer comprises an input device 59 and a printing device 510 each of which is connected to the microcomputer 50.

The input device 59 (e.g., keyboard) is manually operable by an operator or user for inputting a character code corresponding to a desired character; size data indicative of a desired character size; and translation data indicative of a desired character parallel-translation amount along an X or a Y axis (described later). The size and/or translation data provide transformation data (described later). The printing device 510 prints or records by electrophotography a character on a recording medium according to dot-matrix data stored in the dot-matrix data memory 57.

The program ROM 54 stores various control programs employed in the present embodiment. The text memory 55 (e.g., random access memory, RAM) stores the above-described character code or codes and transformation data input through the input device 59. The working memory 56 (e.g., RAM) temporarily stores various data necessary for the CPU 52 to operate according to the control programs stored in the program ROM 54. The dot-matrix data memory 57 stores dot-matrix data converted from outline data. The character-data ROM 53 stores outline data defining the outline or outlines of a character (e.g., letter, numeral, figure, symbol, etc.), and additionally stores hint data used for preventing quantization errors from being introduced into transformed outline data (described later). The character-data ROM 53 is capable of storing a number of sets of outline data and a number of sets of hint data for a number of characters.

A set of outline data represents a character by defining one or more outlines of the character in a two-dimensional orthogonal coordinate system given by an X and a Y axis perpendicular to each other. In the present embodiment, as shown in FIG. 4(a), outline data include a plurality of ordered sets of point data each of which defines the position, i.e., has the x and y coordinates, of a corresponding one of a plurality of defining points which cooperate with each other to define the one or more outlines of the character. The outline data further include, in association with each set of point data by way of a corresponding index number, (a) point-sort data indicating whether that point data defines the terminating end point of a straight line ("L") as a portion of an outline, a control point of a curved line (e.g., quadratic or cubic Bezier curve) ("A") as a portion of an outline, or the terminating end point of a curved line ("B"), and (b) end-point data indicating whether that point data defines the terminating point of an outline ("1") or not ("0"). The outline data additionally include point-number data indicating the total number of the sets of point data, and outline-number data indicating the total number of the outline or outlines of the character. Thus, as shown in FIG. 4(a), the ordered sets of point data provide an ordered array of x coordinates (hereinafter, referred to as the "x-coordinate array"), an ordered array of y coordinates ("y-coordinate array"), an ordered array of point-sort data, and an ordered array of end-point data. A set of point data defining the terminating end point of any straight or curved line also defines the starting end point of a straight or curved line following that line. A set of point data defining the terminating point of an outline also defines the starting point of that outline.

As shown in FIG. 4(b), a set of hint data includes (a) x minimum and maximum data including the minimum (smallest) and maximum (greatest) x coordinates of the outline of a character, (b) y minimum and maximum data including the minimum and maximum y coordinates of the outline of the character, (c) base-line data including the y coordinate of a base line used for positional alignment of the character with other characters with respect to the Y axis; (d) x line-spacing data including the respective x coordinates of two opposite outline portions of a vertical part of the character which extend parallel to the Y axis; and (e) y line-spacing data including the respective y coordinates of two opposite outline portions of a horizontal part of the character which extend parallel to the X axis. One or more of (a) the x minimum and maximum data, (b) the y minimum and maximum data, (c) the base-line data, (d) the x line-spacing data, and (e) the y line-spacing data may be none, or may be in plural sets, for a particular character. Therefore, the hint data further include set-number data indicating the total number of the set or sets of data for each information (a) to (e). The hint data (a) to (e) provide original interval data (described later) which define a plurality of original intervals with respect to each of the X and Y axes of the x-y coordinate system in which the original outline of the character is defined by the original outline data.

Figure 2:
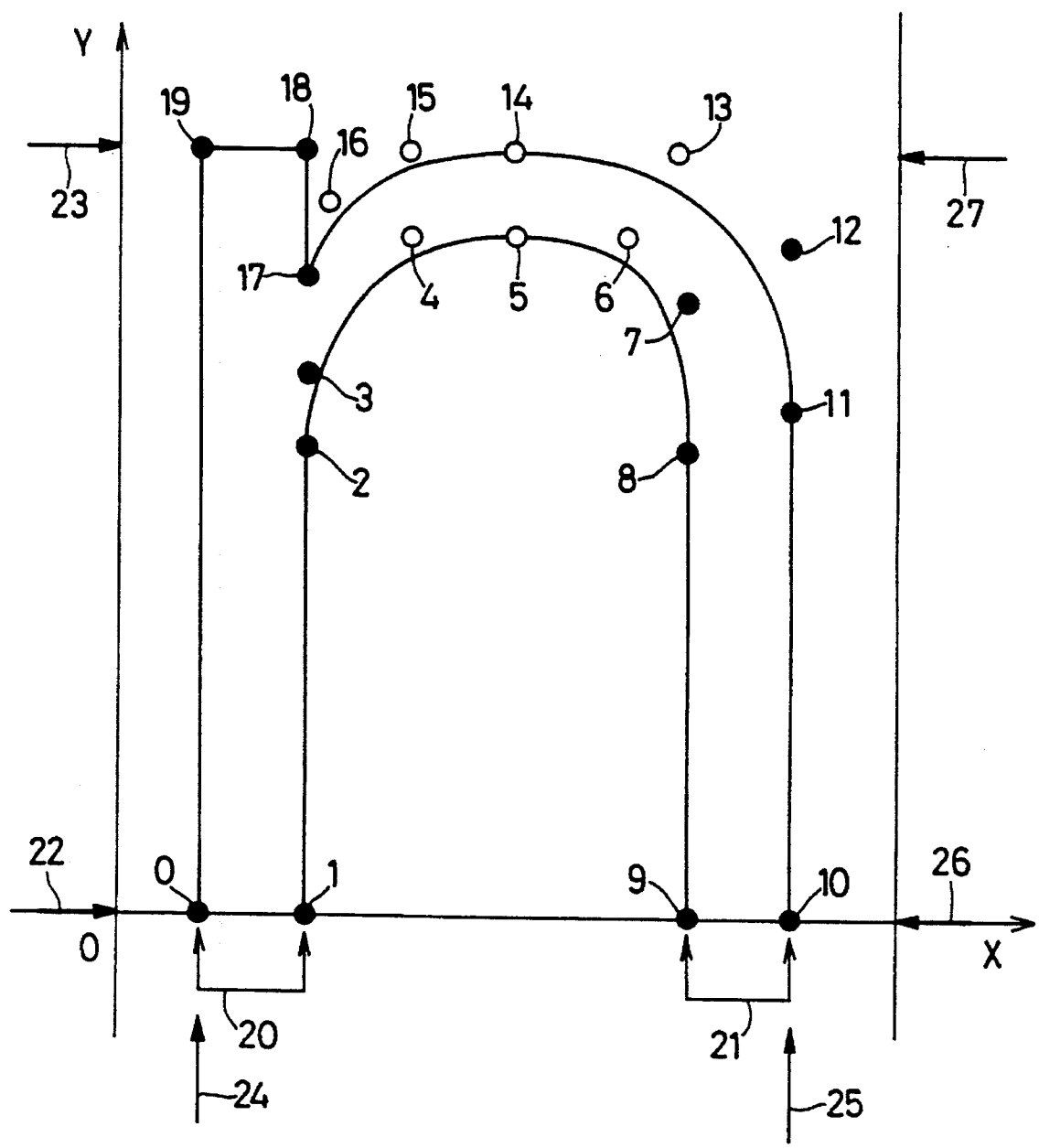
FIG. 2 is a view for visualizing outline data defining the outline of a character, "n"

The tables of FIGS. 4(a) and 4(b) show the character data for a character "n" shown in FIG. 2. The character data are pre-stored in the character-data ROM 53 of the microcomputer 50. As shown in FIG. 2, the outline of character "n" is defined by twenty defining points assigned with respective numbers, 0 to 19, which numbers are utilized as index numbers for association with the corresponding sets of point data shown in FIG. 4(a). A defining point with an index number, i, (i=0, 1, 2, . . . ) in FIG. 2 has an x coordinate, xi, and a y coordinate, yi, in the table of FIG. 4(a). Meanwhile, the hint data for the character "n" include, as the x minimum and maximum data, i.e., "Xmin" and "Xmax" in FIG. 4(b), two x coordinates 24, 25 in FIG. 2 and include, as the y minimum and maximum data, i.e., "Ymin" and "Ymax" in FIG. 4(b), two y coordinates 26, 27 in FIG. 2. The hint data also include, as the base-line data, i.e., "ky0" and "ky1" in FIG. 4(b), two y coordinates 22, 23 in FIG. 2. In the present case, the two y coordinates 26, 27 are equal to the two y coordinates 22, 23, respectively. The hint data further include, as the x line-spacing data, "wx10", "wxh0", "wx11", and "wxh1" in FIG. 4(a), a pair of smaller and greater x coordinates for a first x line spacing 20 in FIG. 2 and another pair of smaller and greater x coordinates for a second x line spacing 21. The hint data for the character "n" do not include any y line-spacing data.

Hereinafter, there will be described the operation of the control circuit, i.e., microcomputer 50 for producing dot-matrix data from character data, i.e., outline data and hint data, by reference to the flow charts of FIGS. 5(a), 5(b), and 6. This dot-matrix data production includes coordinate transformation using a transformation table.

First, the x coordinates of the outline data of the character data are transformed, and subsequently the y coordinates of the same are transformed. Initially, at Step S1 of FIG. 5(a), the CPU 52 reads in, as coordinate-array data, the respective x coordinates of the x-coordinate array of the original outline data, and additionally reads in the point-number data indicating the total number of those x coordinates. The CPU 52 also reads in, as minimum and maximum data, the minimum and maximum x coordinates of the hint data and reads in, as line-spacing data, the x line-spacing data of the hint data. The CPU 52 further reads in the size data (e.g., point number, p) and translation data (i.e., parallel-translation amount) as the transformation data with respect to the X axis, from the text memory 55.

Next, at Step S2, the CPU 52 determines, based on the hint data, i.e., interval data stored in the character-data ROM 53 and the transformation data stored in the text memory 55, a transformation function equation for each of the original intervals defined by the interval data, with respect to the X (or Y) axis of the x-y coordinate system. The table of FIG. 11 shows the thus obtained "transformation table" with respect to the X (or Y) axis. In the present embodiment, the transformation table includes the two constants of a linear function as a transformation function for each of the original intervals. Supposing that an arbitrary x (or y) coordinate, v, be transformed into a new x (or y) coordinate, v', according to a linear function with respect to the X (or Y) axis, the linear function is expressed as follows:

$$v' = a \times v + b$$

where a, b are constants.

As shown in FIG. 11, the transformation table contains the two constants ai, bi (i=0, 1, 2, . . . ) of each of the linear functions for the respective original intervals defined along the X (or Y) axis. To obtain those linear functions, the CPU 52 implements the control program represented by the flow chart of FIG. 6 (described later).

Next, at Step S3, the CPU 52 selects, for each of the respective coordinates v of the x (or y) coordinate array, one of the original intervals in the transformation table to which the coordinate v belongs, i.e., within which the coordinate v falls, and transforms the coordinate v into a new coordinate v' according to the linear function corresponding to the selected original interval. At Step S4, the CPU 52 judges whether the CPU 52 has effected the coordinate transformation with respect to both the X and Y axes. Assuming that a negative judgement be made, the control of the CPU 52 goes to Step S5 to effect the coordinate transformation with respect to the Y axis.

At Step S5, the CPU 52 reads in, as coordinate-array data, the respective y coordinates of the y-coordinate array of the original outline data, and additionally reads in the point-number data indicating the total number of those y coordinates. The CPU 52 also reads in, as minimum and maximum data, the minimum and maximum y coordinates of the hint data, reads in the base-line data of the hint data, and reads in, as line-spacing data, the y line-spacing data of the hint data. The CPU 52 further reads in the size data and translation data as the transformation data with respect to the Y axis, from the text memory 55.

Figure 3:
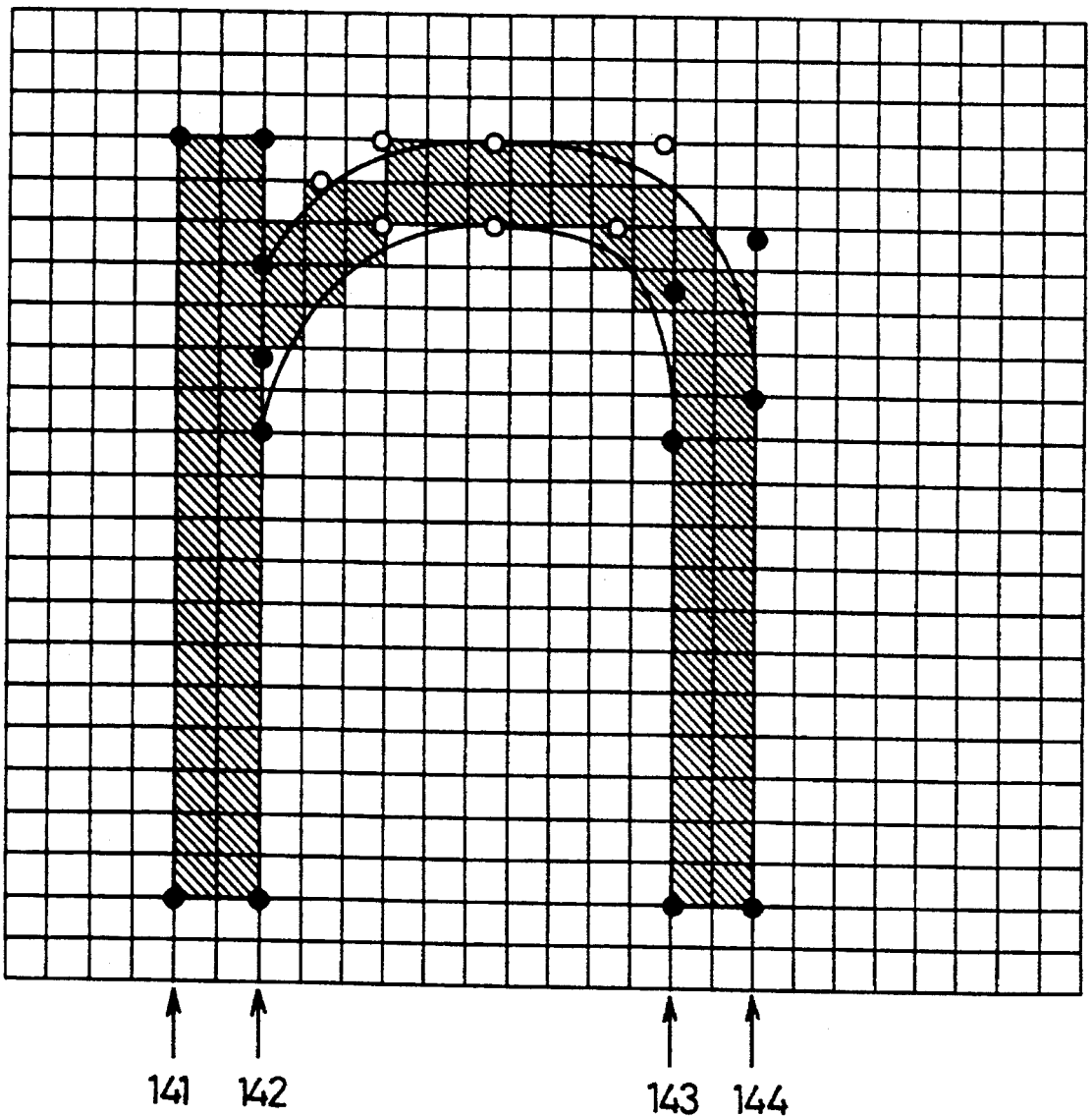
FIG. 3 is a view for visualizing the outline data of character "n" transformed by the control circuit of FIG. 1 and the dot-matrix data produced by the same from the transformed outline data.

Step S5 is followed by Steps S2 and S3 where the CPU 52 operates in the same manner as described above for the coordinate transformation with respect to the X axis. At Step S4, the CPU 52 judges whether the CPU 52 has effected the coordinate transformation with respect to both the X and Y axes. At this time, a positive judgement is made. Thus, the original outline of character "n" of FIG. 2 is transformed into a new outline shown in FIG. 3. Then, the control of the CPU 52 goes to Step S6 of FIG. 5(*b*) to produce dot-matrix data from the transformed outline data, according to a predetermined rule, e.g., one of known raster-scanning methods, and store the produced dot-matrix data in the dot-matrix data memory 57. In the known raster-scanning methods, are produced dot-matrix data which include one or more sets of inside data (e.g., "ON" data) defining the inside area of a character and one or more sets of outside data ("OFF" data) defining the outside area of the character. For example, if the center of each of square unit areas each of which is defined by two adjacent x integral coordinates and two adjacent y integral coordinates falls within the inside area of the transformed outline of a character, that square unit area is defined as a set of inside data, and if not, that square unit area is defined as a set of outside data. The inside and outside areas of a character may reversely be defined by the sets of "OFF" data and the sets of "ON" data, respectively. FIG. 3 shows the dot-matrix data (indicated by hatching) produced from the transformed outline data of character "n".

Next, there will be described the operation of the microcomputer 50 for producing the above-described transformation table at Step S2 of FIG. 5(*a*), by reference to the flow chart of FIG. 6. The following description relates to the production of a transformation table for the x coordinates of the original outline data for the character "n" of FIG. 2.

Meanwhile, the hint data, i.e., original interval data contain (a) one or more sets of position data each set of which includes a single x (or y) coordinate, and (b) one or more sets of spacing data each set of which includes a pair of x (or y) coordinates. A set of position data is used for positional alignment of a character with respect to the X (or Y) axis, and a set of spacing data is used for adjusting the number of square unit area or areas (i.e., picture element or elements) to be located between a pair of transformed x (or y) coordinates. In the present embodiment, the x (or y) minimum and maximum data and the base-line data provide the position data, and the x (or y) line-spacing data provide the spacing data.

Figure 6:
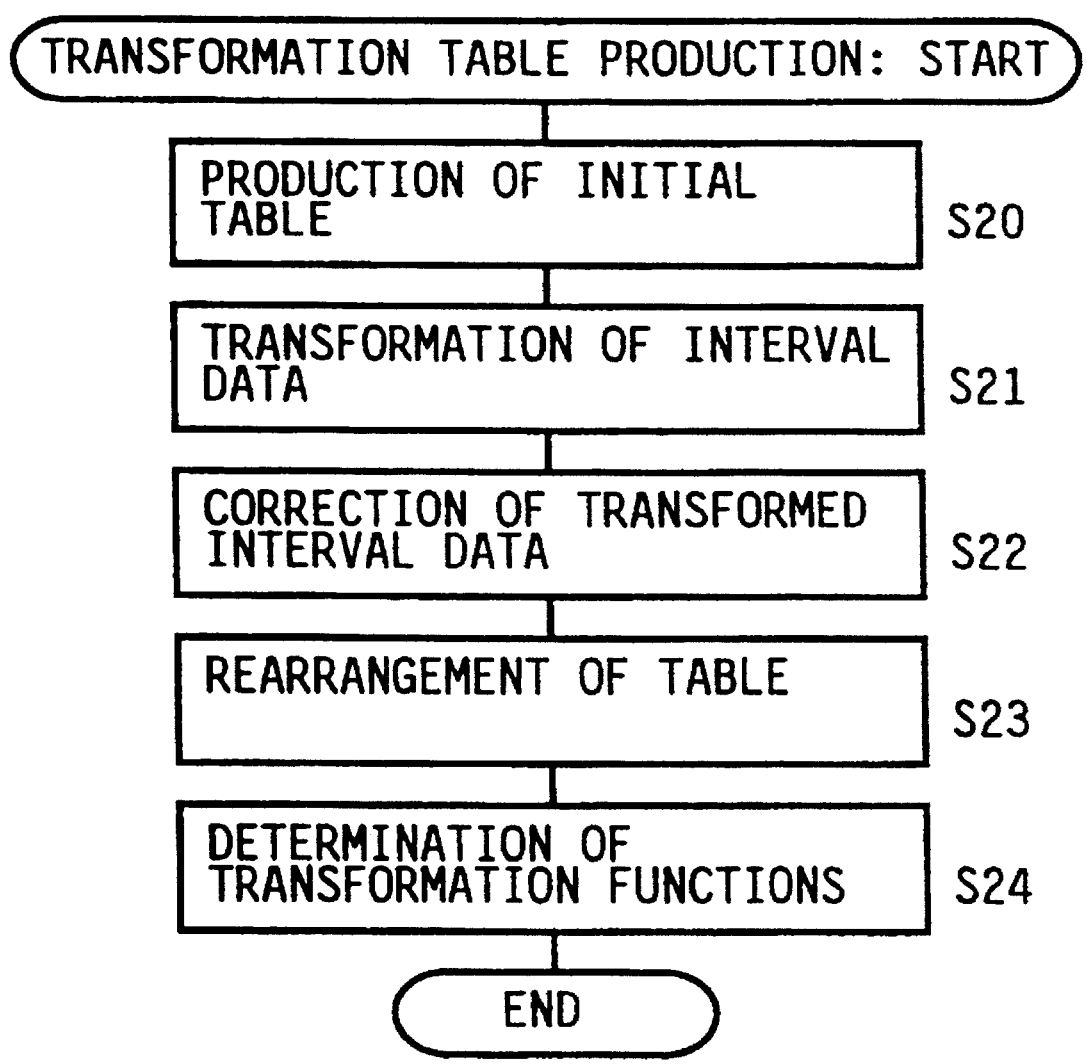
FIG. 6 is a flow chart representing a transformation-table production program executed at Step S2 of FIG. 5(a)

First, at Step S20 of FIG. 6, the CPU 52 sets the original or first interval data with respect to the X axis, into a data table as shown in FIG. 7. In the data table, POSITION DATA 0 corresponds to the minimum x coordinate, Xmin; POSITION DATA 1 corresponds to the maximum x coordinate, Xmax; SPACING DATA 0 corresponds to the first x line-spacing data, i.e., first pair of x coordinates, wx10 and wxh0; and SPACING DATA 1 corresponds to the second x line-spacing data, i.e., second pair of x coordinates, wx11 and wxh1. The coordinates Xmin, wx10, . . . are original x coordinates of the outline data for the character "n".

Subsequently, at Step S21, the CPU 52 transforms the first interval data, i.e., respective original coordinates in the data table of FIG. 7, into second interval data, i.e., respective target coordinates, TXmin, Twx10, . . . , as shown in FIG. 8, according to the transformation data obtained at Step S1. The transformation data specifies the transformation coefficient, Z, and parallel-translation amount, T, of an arbitrary x (or y) coordinate with respect to the X (or Y) axis. The transformation coefficient Z is calculated in the previously-described manner after a desired character size (e.g., point number, p; p=1 is equal to 1/72 inch) is selected by the operator through the input device 59. The parallel-translation amount T is also input by the operator through the input device 59. Each of the original coordinates, v, in the data table of FIG. 7 is transformed into a target coordinate, v', according to the following expression: $v' = Z \times v + T$.

At the following Step S22, the CPU 52 corrects the second interval data, i.e., respective target coordinates TXmin, Twx10, . . . into third interval data, i.e., respective corrected coordinates, HTXmin, HTwx10, ..., as shown in FIG. 9, according to predetermined rules. Different two rules are used for correcting the position data and the spacing data, respectively.

Regarding the position data, the CPU 52 determines each of the corrected coordinates by rounding a corresponding target coordinate, i.e., by counting fractions of ½ and over as one and disregarding the rest. Other rounding methods may be employed. Thus, each corrected coordinate is just aligned with one of x integral coordinates, that is, one of the two boundary lines of a square unit area corresponding to a picture element of the output image of a character to be produced on a recording medium by the printing device 510.

Meanwhile, regarding the spacing data, first, the CPU 52 selects one of the two target coordinates defining each line spacing or width, such that the selected one target coordinate has a smaller distance up to a boundary line of any picture element than that of the other target coordinate, and regards the selected one target coordinate as a base coordinate and the other target coordinate as a dependent coordinate. Additionally, the CPU 52 determines a "spacing" vector by multiplying the coefficient Z and a vector starting at the original coordinate corresponding to the base coordinate and ending at the original coordinate corresponding to the dependent coordinate, and rounds the length of the "spacing" vector by counting fractions of ½ and over as one and disregarding the rest. The CPU 52 determines a first corrected coordinate by moving the base coordinate to the boundary of picture element nearest thereto, i.e., rounding the base coordinate in the same manner as described above. Subsequently, the CPU 52 determines a second corrected coordinate by adding the rounded length of the "spacing" vector to the first corrected coordinate. Regarding the example of FIG. 9, this operation is effected two times for the two sets of x line-spacing data, SPACING DATA 0 and SPACING DATA 1.

In the graph of FIG. 3, the corrected coordinates HTXmin, HTwx10 of FIG. 9 are indicated at 141, the coordinates HTwxh0 and HTwx11 are indicated at 142, 143, respectively, and the coordinates HTwxh1, HTXmax are indicated at 144.

Subsequently, at Step S23, the CPU 52 rearranges the data table of FIG. 9 into the data table shown in FIG. 10 in which the corrected coordinates are re-arranged in the order of magnitude, and adds one data space following the bottom or last data space.

Last, at Step S24, the CPU 52 divides the X (or Y) axis by the respective original coordinates of the first interval data, obtains a plurality of original intervals on the X (or Y) axis, and determines a transformation-function equation for each of the thus obtained original intervals. As described above, a linear function is used as each transformation function. Supposing that each linear function be expressed as $v'=a \times v+b$, the CPU 52 sets constants $a_i$, $b_i$ ($i=0, 1, 2, \ldots$) in the data table shown in FIG. 11. This data table corresponds to the transformation table for the x coordinates of the original outline data of the character "n". In the transformation table, constants $a_i$, $b_i$ define a linear function for an original interval which is not smaller than an original coordinate with a number $i-1$ and smaller than an original coordinate with a number $i$. For example, constants $a0$, $b0$ define a linear function for an interval smaller than an original coordinate numbered 0, and constants $a6$, $b6$ define a linear function for an interval not smaller than an original coordinate numbered 5.

Regarding the transformation functions for the respective original intervals each of which is defined by, and between, two original coordinates, that is, linear functions numbered 1 to 5 in the data table of FIG. 11, the two constants a, b of each linear function are obtained by (a) replacing the values v, v' of the linear function: $v'=a \times v+b$, with one of the two original coordinates, p, and the corresponding corrected coordinate, p' respectively; (b) subsequently replacing the values v, v' with the other original coordinate, q, and the corresponding corrected coordinate, q', respectively; and (c) then solving the thus obtained simultaneous equations with two unknowns a, b. The thus solved two constants a, b are as follows:

$$a=(q'-p')/(q-p)$$

$$b=(p' \times q - q' \times p)/(q-p)$$

Meanwhile, regarding the transformation functions for the respective intervals each of which is defined by only a single original coordinate, that is, linear functions numbered 0 and 6 in the data table of FIG. 11, the coefficient Z is used as the constant a of each linear function (i.e., a=Z), and the constant b is obtained by replacing the values v, v' of the linear function: $v'=a \times v+b$, with the single original coordinate, p, and the corresponding corrected coordinate, p', respectively. The thus obtained two constants a, b are as follows:

$$a=Z$$

$$b=p'-p \times Z$$

On the other hand, in the case where the character data include no hint data, i.e., no original interval data with respect to the X (or Y) axis, that is, where no original intervals are defined with respect to the X (or Y) axis, there is no possibility that the dot-matrix data produced from the outline data suffer from quantization errors. In this case, therefore, the CPU 52 determines the scale factor Z and the parallel-translation amount T as the constants a, b of the linear function: $v'=a \times v+b$, respectively; therefore, $$a=Z$$

$$b=T$$

The thus obtained linear function: $v'=Z \times v+T$ is used for transforming the x (or y) original coordinates of the outline data. However, the last linear function is not determined for the particular case of the original outline data of character "n".

FIG. 11 shows the transformation table produced for transforming the respective x coordinates, v, of the original outline data for the character "n" of FIG. 2, into the corresponding x coordinates, v' of the transformed outline data of FIG. 3. Specifically, at Step S3 of FIG. 5(a), the CPU 52 transforms the x coordinates falling within the interval numbered 2, i.e., interval not smaller than the smaller coordinate wx10 of the first line spacing 20 and smaller than the greater coordinate wxh0 of the line spacing 20, according to the linear function, $v'=a2 \times v+b2$; transforms the x coordinates falling within the interval numbered 3, i.e., interval not smaller than the greater coordinate wxh0 of the first line spacing 20 and smaller than the smaller coordinate wx11 of the second line spacing 21, according to the linear function, $v'=a3 \times v+b3$; transforms the x coordinates falling within the interval numbered 4, i.e., interval not smaller than the smaller coordinate wx11 of the second line spacing 21 and smaller than the greater coordinate wxh1 of the line spacing 21, according to the linear function, $v'=a4 \times v+b4$; and transforms the x coordinates falling within the interval numbered 6, i.e., interval not smaller than the coordinate Xmax, according to the linear function, $v'=a6 \times v+b6$. The original outline data include no x coordinates falling within the intervals numbered 0, 1, and 5. Similar transformation operation is effected with respect to the Y axis, i.e., y coordinates of the original outline data of the character "n". The hint data for the character "n" do not include any y spacing data, and include the base-line data as well as the y minimum and maximum data.

The transformed outline data obtained at Step S3 by using the transformation table obtained at Step S2 are free from quantization errors, because the transformation table employs the transformation functions having the characteristics of correcting the quantization errors possibly produced when the original outline data are converted into the transformed outline data.

There will be described a second embodiment of the present invention by reference to FIG. 12. The second embodiment has the same hardware construction as that of the first embodiment shown in FIG. 1, but it operates according to the control program represented by the flow chart of FIG. 12 in place of the flow charts of FIGS. 5(a) and 6 employed in the first embodiment.

While in the first embodiment the x or y coordinates of original outline data of a character are transformed at Step S3 after a transformation table has been produced at Step S2, that is, transformation functions have been determined for all the original intervals defined with respect to the X or Y axis, the dot-matrix data producing apparatus in accordance with the second embodiment transforms each of the x or y coordinates of the original outline data while determining a transformation function for a particular original interval within which that coordinate falls, and repeat this operation for all the x or y coordinates. This coordinate transformation will be described in detail below.

Figure 5A:
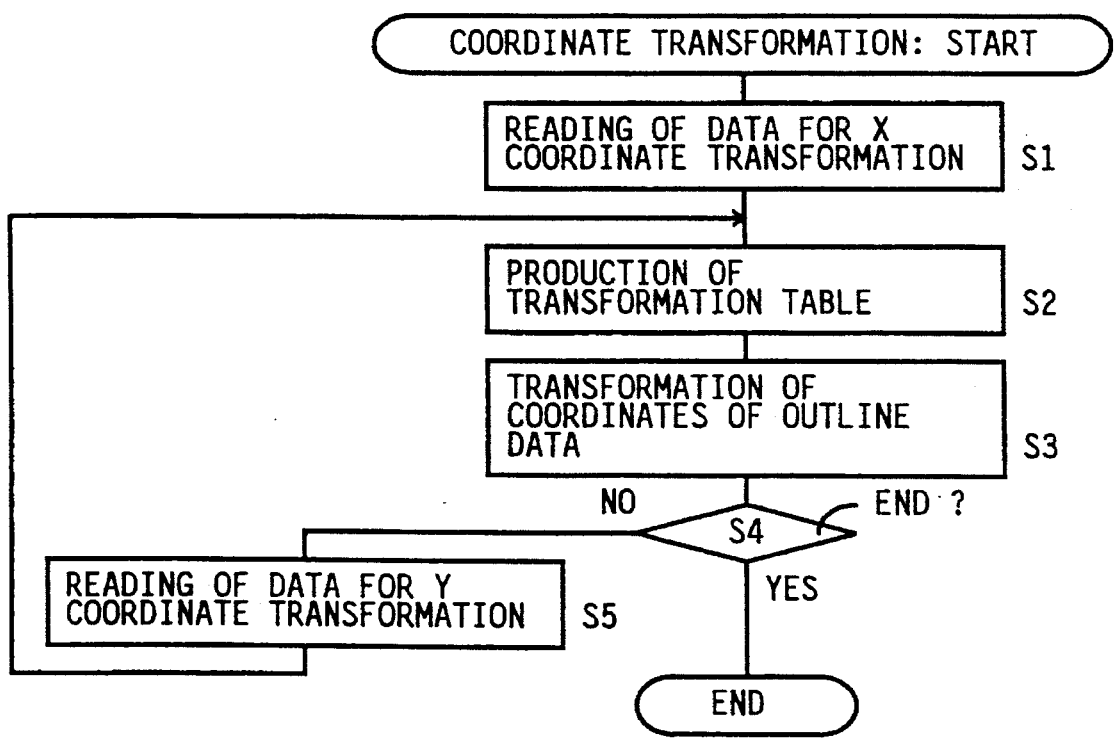
FIG. 5(a) is a flow chart representing a coordinate transformation program employed by the control circuit of FIG. 1.
Figure 5B:
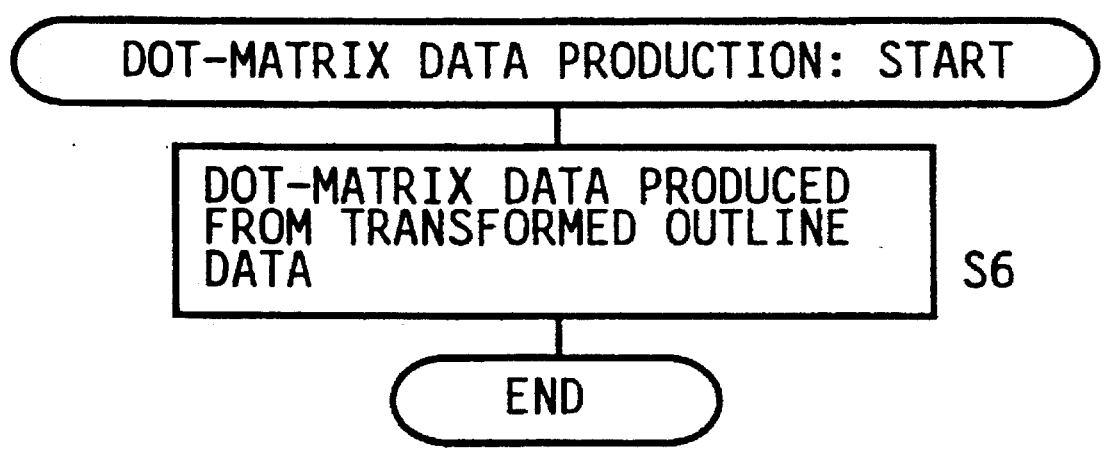
FIG. 5(b) is a flow chart representing a dot-matrix data production program employed by the control circuit of FIG. 1.
Figure 12:
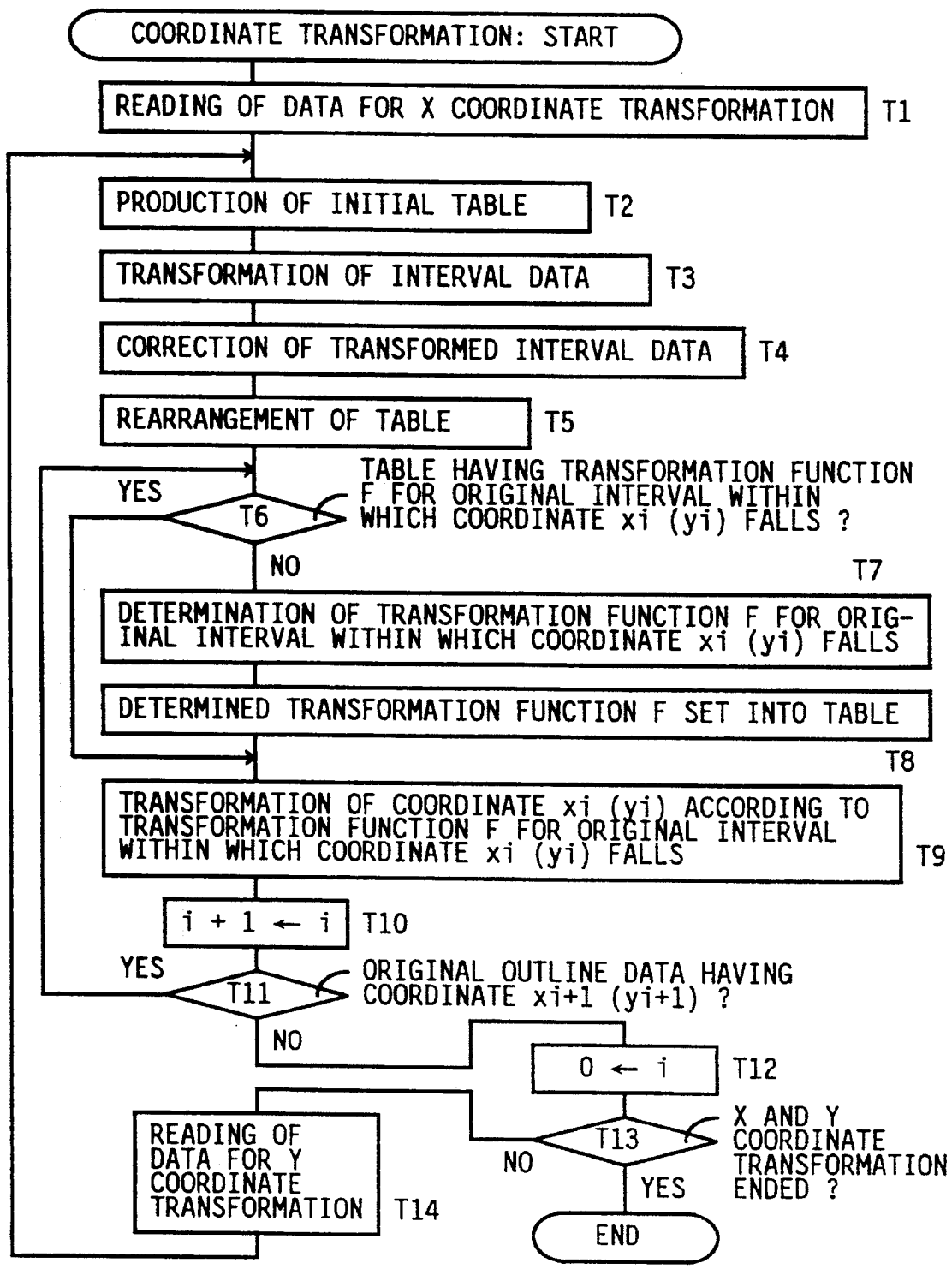
FIG. 12 is a flow chart representing a coordinate transformation program employed by a control circuit of a laser printer as a second embodiment of the invention.

Step T1 of FIG. 12 is the same as Step S1 of FIG. 5(a), and Steps T2 through T5 are the same as Steps S20 through S23 of FIG. 6, respectively. The description of Steps T1 to T5 is omitted. Step T5 is followed by Step T6 to judge whether a transformation function, F, for a particular original interval within which a current original coordinate xi (or yi; i=0, 1, 2, ... ) falls, is set in the data table of FIG. 10 obtained at Step T5. If a positive judgment is made at Step T6, the control of the CPU 52 skips Steps T7 and T8 and directly goes to Step T9 (described later). On the other hand, if a negative judgment is made, the control goes to Step T7 to determine the transformation function F (i.e., constants a, b of the linear function, v'=a×v+ b) for the original interval within which the original coordinate xi (or yi) falls, in the same manner as carried out at Step S24 of FIG. 6. Subsequently, at Step T8, the CPU 52 operates for setting the thus determined function F, i.e., constants a, b in an appropriate data space in the data table of FIG. 10. Steps T3 and T4 may be effected for only the original interval in question before Step T7.

Step T8 is followed by Step T9 to transform the coordinate xi (yi) according to the transformation function F for the original interval to which the original coordinate xi (yi) belongs. Subsequently, at Step T10, the CPU 52 updates the contents of a counter from i to i+1. Step T10 is followed by Step T11 to judge whether the original outline data include an original coordinate xi+1 (yi+1). If a positive judgment is made at Step T11, the control of the CPU 52 goes back to Step T6. On the other hand, if a negative judgment is made, the control goes to Step T12 to reset the contents of the counter from 1 to 0, and further goes to Step T13 that is the same as Step S4 of FIG. 5(a). If a positive judgment is made at Step T13, a current control cycle is ended. On the other hand, if a negative judgment is made, the control of the CPU 52 goes to Step T14 that is the same as Step S5 of FIG. 5(a). Following Step T14, the control of the CPU 52 goes back to Step T2 and the following steps. When the control of the CPU 52 reaches Step T13 again, a positive judgment is made, therefore the current control cycle is ended.

As described previously, the original outline data of character "n" has no x coordinates in the original intervals numbered 0, 1, and 5. However, the apparatus in accordance with the first embodiment determines the transformation functions for the intervals numbered 0, 1, and 5. In contrast, according to the second embodiment, no transformation functions are determined for the intervals numbered 0, 1, and 5, because no original x coordinates fall within the intervals numbered 0, 1, and 5. Since each transformation function F determined and used is set in the data table of FIG. 10, the function F may be used for other original x (or y) coordinates falling within the same original interval. Thus, in the second embodiment, the production efficiency of dot-matrix data are improved to a higher degree.

While the present invention has been described in its preferred embodiments, the present invention may otherwise be embodied.

For example, although the illustrated embodiments relate to a dot-matrix data producing apparatus incorporated in a laser printer, it is possible to apply the principle of the present invention to other types of printers and additionally to displays. Furthermore, the present invention is applicable to any apparatus which produces dot-matrix data from outline data.

Figure 13A:
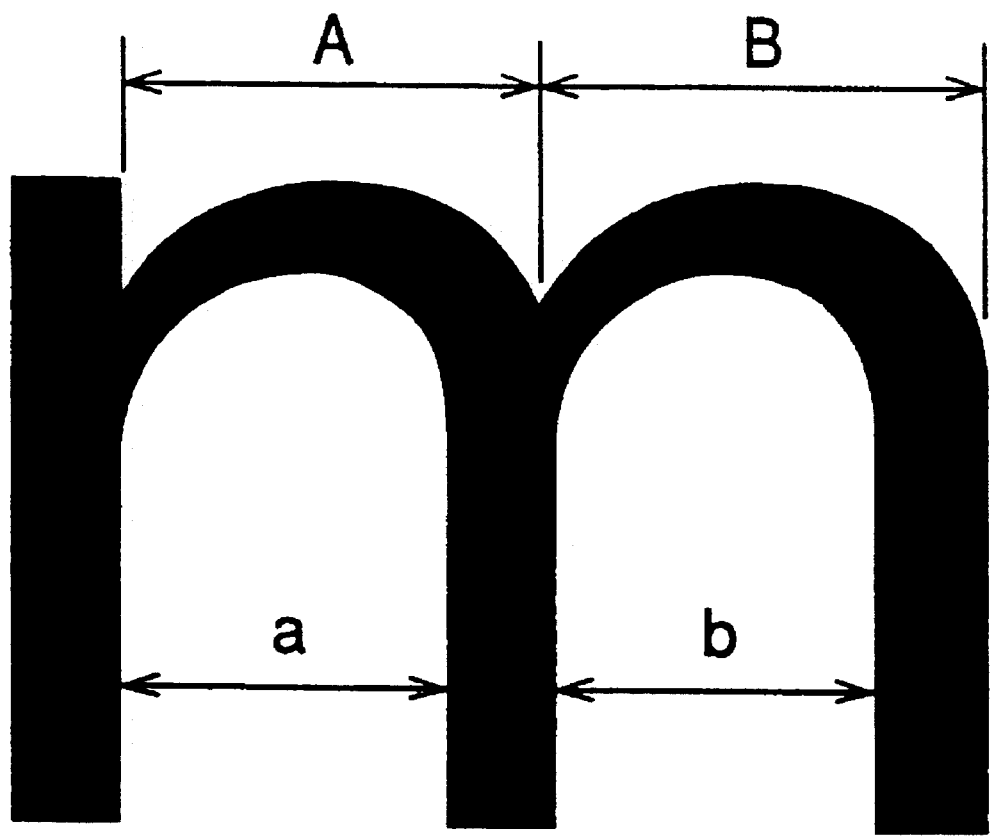
FIG. 13(a) is a view for explaining sets of position and spacing data as hint data for a character.
Figure 13B:
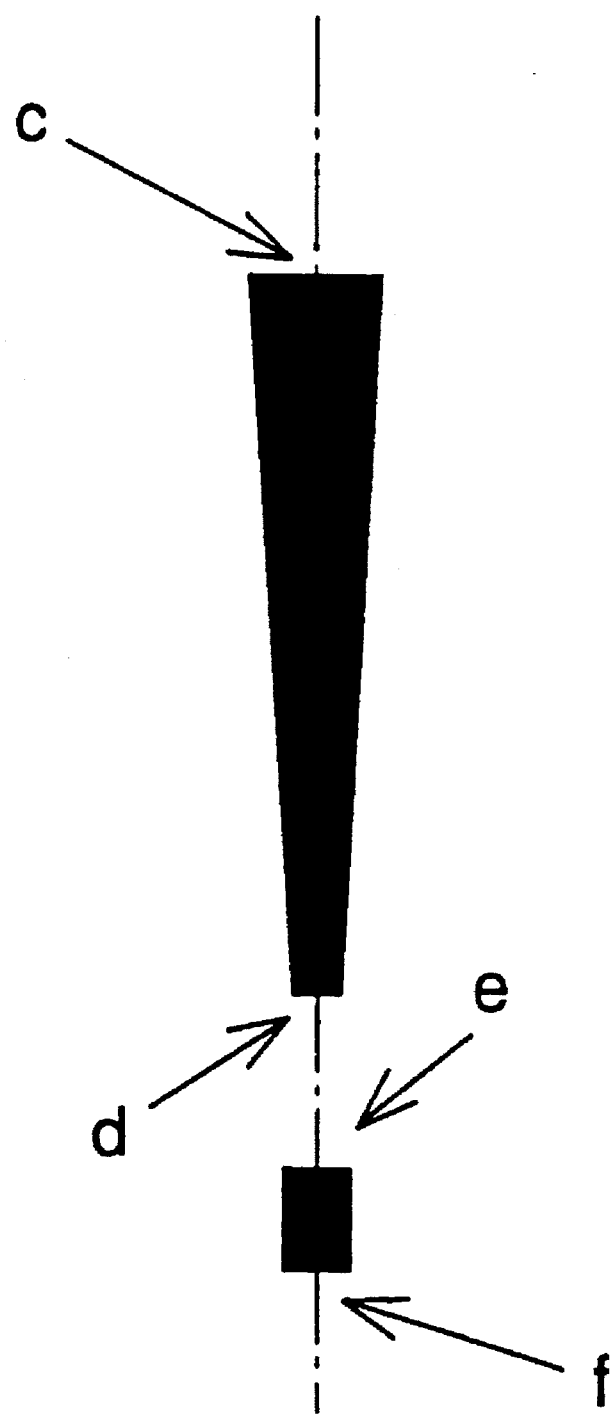
FIG. 13(b) is a view for explaining a set of center line data as hint data for a character.

While in the illustrated embodiments the hint data or original interval data include the x and Y minimum and maximum data, y base-line data, and x and y line-spacing data, it is possible to omit one or more sorts of those data and/or add one or more different sorts of data. For example, the hint data may include x base-line data used for alignment of a character with other characters with respect to the X axis. In addition, the hint data may include sets of position and spacing data defining the respective lengths of two similar parts of a character (e.g., A and B of a character "m" shown in FIG. 13(a)), and/or the two distances of three vertical or horizontal parts of a character (e.g., a and b of character "m"). Those sets of position and spacing data are used for compensating for quantization errors which are possibly introduced into the lengths A, B and/or distances a, b of the outline when the outline data are transformed, and thereby maintaining the prescribed relationship (e.g., equality, ratio, etc.) between the two lengths or distances on an output image. Furthermore, the hint data may include a set of center position data defining a center line of an output image (e.g., x center line of a character "!" indicated by c, d, e, and f in FIG. 13(b)). Although in the illustrated embodiments the base-line data are prepared for each of different sets of character data for different characters, common base-line data may be employed for all sets of character data used in the laser printer.

Figure 14A:
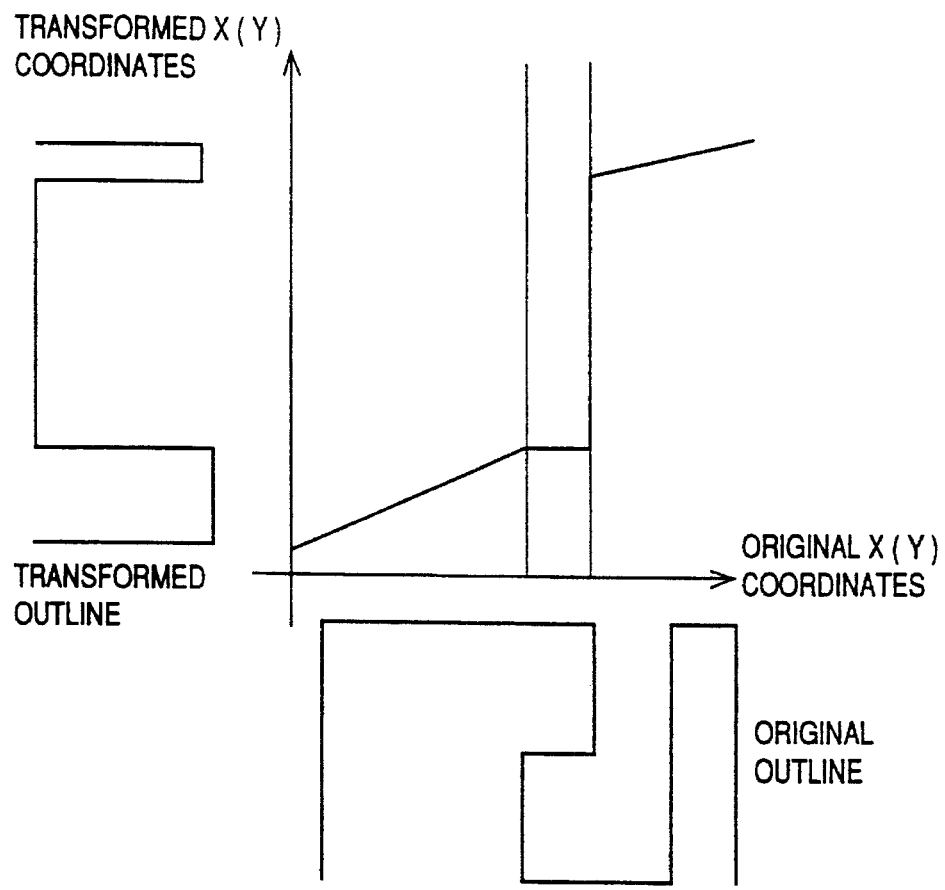
FIG. 14(a) is a view for explaining a linear function used for transforming outline data for a character.
Figure 14B:
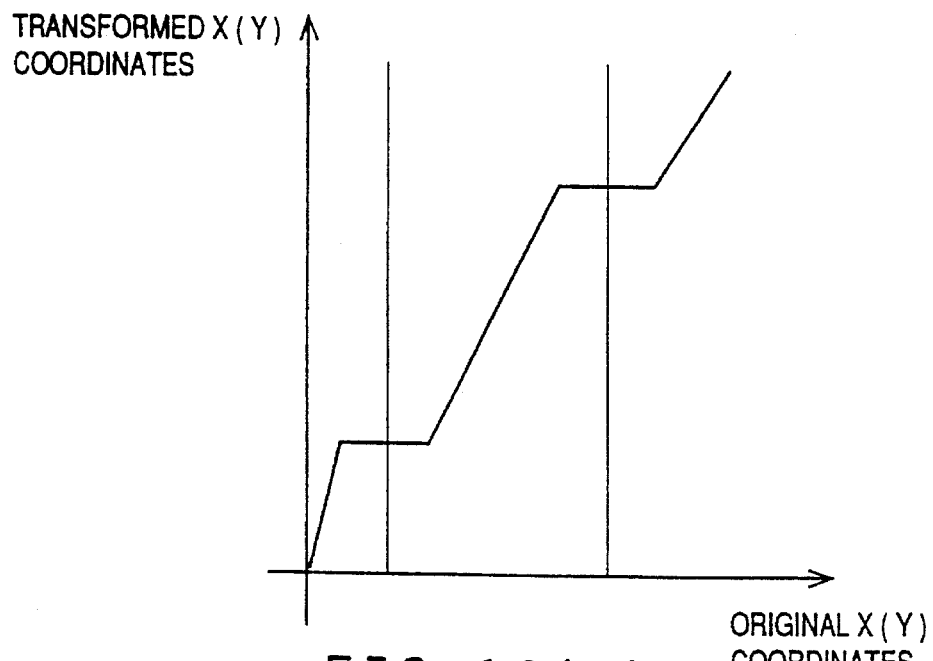
FIG. 14(b) is a view for explaining another linear function used for transforming outline data for a character.
Figure 16:
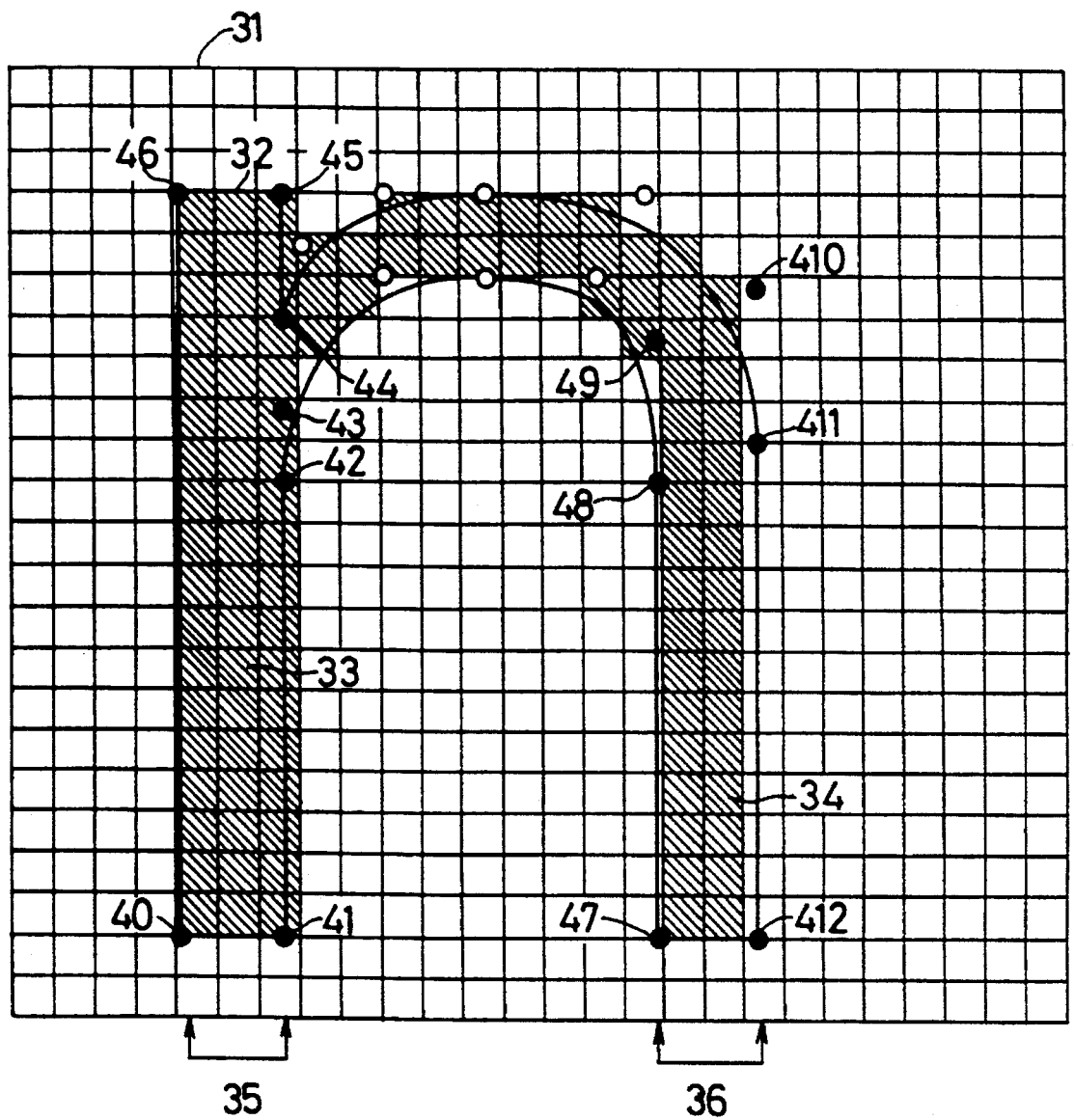
FIG. 16 is a view for explaining dot-matrix data produced from the outline data of character "n" which have been transformed, but not corrected, in a conventional method.
Figure 17:
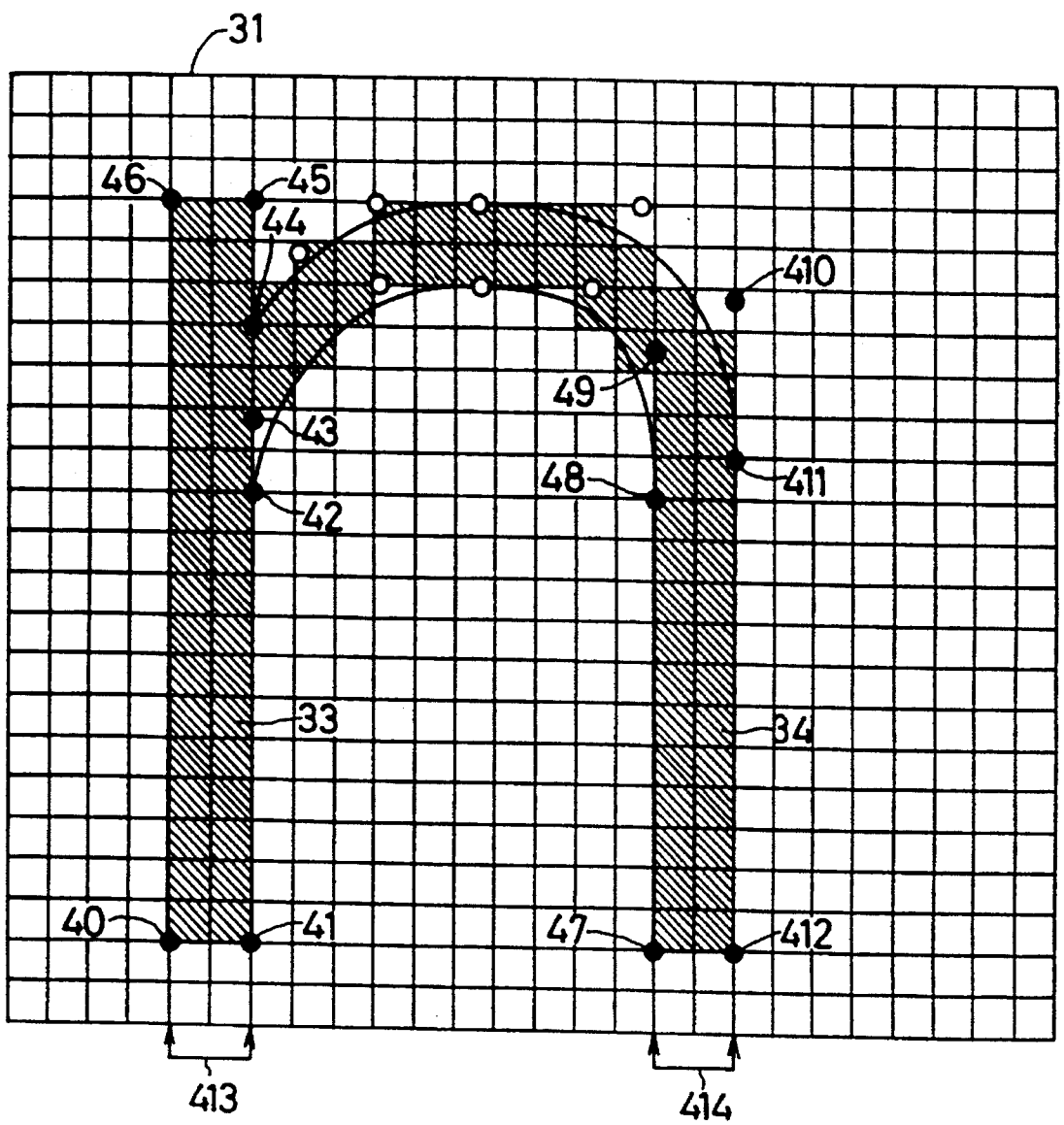
FIG. 17 is a view for explaining dot-matrix data produced from the outline data of character "n" which have been transformed and corrected in another conventional method.

While in the illustrated embodiments linear functions, v'=a×v+b, are employed as transformation functions, higher-order functions may be used. Additionally, other linear functions than those described in the embodiments may be used. For example, as shown in FIG. 14(a), it is possible to determine only a constant value, b, (i.e., a=0) for an original interval when a corresponding transformed or corrected interval has a range or width smaller than a reference value. Additionally, as shown in FIG. 14(b), it is possible to determine only a constant value, b, (i.e., a=0) for a prescribed range around an end point of an original interval when a corresponding transformed or corrected interval has a range or width smaller than a reference value. When a desired character size p becomes smaller, a square unit area corresponding to a picture element becomes larger relative to the transformed outline of a character. Thus, even small quantization errors may be amplified and the amplified errors may be introduced into dot-matrix data and eventually into an output image. This problem is effectively prevented by using the above-indicated modified linear functions.

Although in the illustrated embodiments the outline data of a whole character is converted into dot-matrix data, it is possible to adapt the illustrated apparatus to first divide a character into a plurality of small sections and subsequently transform the outline data of each section into dot-matrix data. Thus, the invention apparatus is capable of producing dot-matrix data from any outline data defining one or more outlines of an image and thereby dividing the inside and outside areas of the image. For example, FIG. 15(a) shows a series of characters "A" to "K". When a desired character size p is very large, the invention apparatus divides the outline data of each character into the upper and lower halves thereof and converts the divided outline data into dot-matrix data, first the upper-half outline data of each of characters "A" to "K" as shown in FIG. 15(b) and subsequently the lower-half outline data of each character "A" to "K" as shown in FIG. 15(c). Conversely, it is possible to transform respective sets of outline data for two or more small sections according to the principle of the present invention, combine the transformed sets of outline data, and convert the combined outline data into dot-matrix data for a whole character. For example, German umlaut and a character such as "a", "u" and "o" may be combined.

It is to be understood that the present invention may be embodied with other changes, improvements, and modifications that may occur to those skilled in the art without departing from the scope and spirit of the invention defined in the appended claims.

What is claimed is:

1. An apparatus for producing dot-matrix data from outline data defining at least one original outline of an alpha-numeric character or other symbol in an image in a two-dimensional coordinate system provided by an X axis and a Y axis perpendicular to each other, comprising:

first transforming means for transforming, according to transformation data, first interval data defining a plurality of original intervals with respect to at least one of said X axis and said Y axis, into second interval data defining a plurality of transformed intervals with respect to said at least one of said X axis and said Y axis;

correcting means for correcting, according to a first predetermined rule, said second interval data into third interval data defining a plurality of corrected intervals with respect to said at least one of said X axis and said Y axis;

transformation-function determining means for determining, based on said first interval data and said third interval data, a transformation function for each of at least one of said original intervals defined with respect to said at least one of said X axis and said Y axis;

second transforming means for transforming first outline data as said outline data, into second outline data defining at least one transformed outline of said image, said first outline data comprising a plurality of original sets of x and y coordinates which cooperate with each other to define said original outline of said image, said second outline data comprising a plurality of transformed sets of x and y coordinates which cooperate with each other to define said transformed outline of said image, said second transforming means transforming at least one of (a) an x coordinate and (b) a y coordinate of at least one said original set of x and y coordinates within each of said at least one of said original intervals defined with respect to said at least one of (a) said X axis and (b) said Y axis, into at least one of (a) an x coordinate and (b) a y coordinate of at least one said transformed set of x and y coordinates within a corresponding one of said corrected intervals, according to said transformation function determined for said each original interval;

dot-matrix data producing means for producing said dot-matrix data from said second outline data according to a second predetermined rule, said dot-matrix data comprising a plurality of sets of inside data substantially defining an image area within said transformed outline of said image defined by said second outline data, and a plurality of sets of outside data substantially defining an outside area outside of said transformed outline of said image; and presentation means for presenting said dot-matrix data to an observer corresponding to the alpha-numeric character or other symbol in the image.

2. An apparatus according to claim 1, wherein said presentation means comprises a printing device which records, on a recording medium, said image according to said dot-matrix data comprising said sets of inside data and said sets of outside data defining picture elements of the image to be recorded on the recording medium.

3. An apparatus according to claim 1, further comprising a dot-matrix data memory which stores said dot-matrix data.

4. An apparatus according to claim 1, further comprising an original-data memory which stores at least one of said first outline data and said first interval data, said first outline data defining at least one original outline of a character as said image, said original sets of x and y coordinates of said first outline data comprising at least one of (a) a set of x and y coordinates defining an end point of a straight line as a portion of said original outline, and (b) a plurality of sets of x and y coordinates defining at least one control point and an end point of a Bezier curve as a portion of said original outline.

5. An apparatus according to claim 1, further comprising an input device which is operable for inputting at least one of (a) said transformation data and (b) at least one character code corresponding to at least one set of character data as said first outline data and said first interval data for at least one character as said image.

6. An apparatus according to claim 5, further comprising a parameter memory which stores said at least one of (a) said transformation data and (b) said at least one character code, (a) said transformation data comprising at least one of (a1) size-related data relating to a size of said image with respect to said at least one of said X axis and said Y axis and (a2) a translation value indicative of a parallel-translation amount of said image with respect to said at least one of said X axis and said Y axis.

7. An apparatus according to claim 6, wherein said parameter memory stores (a) said transformation data including said (a1) size-related data comprising a size value indicative of said size of said image with respect to said at least one of said X axis and said Y axis.

8. An apparatus according to claim 1, further comprising reading means for reading at least one of said first outline data, said first interval data, and said transformation data.

9. An apparatus according to claim 1, wherein said first interval data comprise at least one of (a) x position data including one original x coordinate out of said original sets of x and y coordinates, (b) x spacing data including two original x coordinates out of said original sets of x and y coordinates, (c) y position data including one original y coordinate out of said original sets of x and y coordinates, and (d) y spacing data including two original y coordinates out of said original sets of x and y coordinates.

10. An apparatus according to claim 9, wherein said first transforming means comprises linear transformation means for transforming at least one, v, of (a) said one original x coordinate as said x position data, (b) said two original x coordinates as said x spacing data, (c) said one original y coordinate as said y position data, and (d) said two original y coordinates as said y spacing data, of said first interval data, into said second interval data comprising at least one, v', of (a) one transformed x coordinate corresponding to said one original x coordinate, (b) two transformed x coordinates corresponding to said two original x coordinates, (c) one transformed y coordinate corresponding to said one original y coordinate, and (d) two transformed y coordinates corresponding to said two original y coordinates, according to a linear function, v'=Z×v+ T, defined by said transformation data comprising a transformation coefficient, Z, with respect to said at least one of said X axis and said Y axis and a constant, T, with respect to said at least one of said X axis and said Y axis.

11. An apparatus according to claim 10, wherein said linear transformation means transforms said first interval data into said second interval data according to said linear function, v'=Z×v+T, with respect to each of (a) said X axis and (b) said Y axis, such that said transformation coefficient Z is defined by a following expression:

$$Z=(p \times d)/(I \times e)$$

where p is a desired size value of said image input through an input device;

d is a resolution of said image defined by said dot-matrix data;

e is an original size value of said image defined by said first outline data; and I is a constant, so that each of said sets of inside data and said sets of outside data of said dot-matrix data corresponds to a square unit area whose four vertices are defined by two adjacent transformed x integral coordinates, x and x+1, and two adjacent transformed y integral coordinates, y and y+1.

12. An apparatus according to claim 10, wherein said correcting means comprises rounding means for correcting at least one of (a) said one transformed x coordinate and (c) said one transformed y coordinate, of said second interval data, into said third interval data comprising at least one of (a) one corrected x coordinate corresponding to said one transformed x coordinate and (c) one corrected y coordinate corresponding to said one transformed y coordinate, according to said first predetermined rule wherein each of said at least one of (a) said one transformed x coordinate and (c) said one transformed y coordinate is rounded, according to a predetermined rounding rule, to one of a number of reference coordinates equidistant from one another by a unit distance with respect to a corresponding one of said at least one of said X axis and said Y axis, said one reference coordinate providing a corresponding one of (a) said one corrected x coordinate and (c) said one corrected y coordinate.

13. An apparatus according to claim 12, wherein said rounding means rounds, according to said predetermined rounding rule, said each of said at least one of (a) said one transformed x coordinate and (c) said one transformed y coordinate, to one nearest thereto of said reference coordinates.

14. An apparatus according to claim 10, wherein said correcting means comprises rounding means for correcting at least one of (b) said two transformed x coordinates and (d) said two transformed y coordinates, of said second interval data, into said third interval data comprising at least one of (b) two corrected x coordinates corresponding to said two transformed x coordinates and (d) two corrected y coordinates corresponding to said two transformed y coordinates, according to said first predetermined rule wherein one of the two transformed coordinates of each of said at least one of (b) said two transformed x coordinates and (d) said two transformed y coordinates which one transformed coordinate satisfies a predetermined rounding condition regarding one of a number of reference coordinates equidistant from one another by a unit distance with respect to a corresponding one of said at least one of said X axis and said Y axis, is rounded to said one reference coordinate as a first reference coordinate and wherein the other of said two transformed coordinates is changed to a second reference coordinate by a rounded distance of said two transformed coordinates, said rounded distance being equal to an integral number of said unit distances, said first and second reference coordinates providing the two corrected coordinates corresponding to said two transformed coordinates, respectively.

15. An apparatus according to claim 14, wherein said rounding means rounds one of said two transformed coordinates which one transformed coordinate satisfies a predetermined rounding condition that said one transformed coordinate has a smaller distance up to one nearest thereto of said reference coordinates than that of the other of said two transformed coordinates.

16. An apparatus according to claim 10, wherein said correcting means comprises means for correcting, according to said first predetermined rule, at least one of (a) said one transformed x coordinate, (b) said two transformed x coordinates, (c) said one transformed y coordinate, and (d) said two transformed y coordinates, each of said second interval data, into said third interval data comprising at least one of (a) one corrected x coordinate corresponding to said one transformed x coordinate, (b) two corrected x coordinates corresponding to said two transformed x coordinates, (c) one corrected y coordinate corresponding to said one transformed y coordinate, and (d) two corrected y coordinates corresponding to said two transformed y coordinates.

17. An apparatus according to claim 16, wherein said transformation-function determining means comprises means for determining, as said transformation function for said each of said at least one of said original intervals defined with respect to said at least one of said X axis and said Y axis, a linear function, v'=a×v+b, wherein, when said each original interval has two opposite ends respectively defined by two adjacent original coordinates, p and q, out of (a) at least one said one original x coordinate as said x position data, (b) at least one pair of said two original x coordinates as said x spacing data, (c) at least one said one original y coordinate as said y position data, and (d) at least one pair of said two original y coordinates as said y spacing data, said constants a, b of said linear function are as follows:

$$a=(q'-p')/(q-p)$$

$$b=(p' \times q - q' \times p)/(q-p)$$

where p' and q' are the two corrected coordinates corresponding to said two original coordinates p, q, respectively.

and wherein, when said each original interval has only one end defined by one, p, of a greatest and a smallest original coordinate out of (a) at least one said one original x coordinate, (b) at least one pair of said two original x coordinates, (c) at least one said one original y coordinate, and (d) at least one pair of said two original y coordinates, said constants a, b of said linear function are as follows:

$$a=Z$$

$$b=p'-p \times Z$$

where

Z is a transformation coefficient with respect to said at least one of said X axis and said Y axis, said transformation data comprising said transformation coefficient; and p' is the corrected coordinate corresponding to said one original coordinate p.

18. An apparatus according to claim 1, wherein said dot-matrix producing means comprises means for producing said dot-matrix data from said second outline data according to said second predetermined rule wherein, when a center of each of a number of rectangular unit areas each of which is defined by (a) a consecutive two of a number of reference x coordinates equidistant from one another by a first unit distance with respect to said X axis and (b) by a consecutive two of a number of reference y coordinates equidistant from one another by a second unit distance with respect to said Y axis, falls inside said transformed outline of said image defined by said second outline data, said each rectangular unit area is defined by one said set of inside data and, when not, said each rectangular unit area is defined by one said set of outside data, said first unit distance being equal to a distance between two transformed x integral coordinates, said second unit distance being equal to a distance between two transformed y integral coordinates.

19. An apparatus according to claim 1, further comprising a transformation-function memory which stores the transformation function determined by said transformation-function determining means for each of said original intervals defined with respect to said at least one of said X axis and said Y axis, wherein after said transformation-function determining means determines said transformation function for said each of said original intervals and said transformation-function memory stores said transformation function determined for said each of said original intervals, said second transforming means transforms said at least one of (a) said x coordinate and (b) said y coordinate of at least one said original set of x and y coordinates within said each of said original intervals, into said at least one of (a) said x coordinate and (b) said y coordinate of at least one said transformed set of x and y coordinates within said corresponding one of said corrected intervals, according to said transformation function determined for said each of said original intervals and stored in said transformation-function memory.

20. An apparatus according to claim 1, further comprising:

a transformation-function memory which stores said transformation determined by said transformation-function determining means for said each of said at least one of said original intervals defined with respect to said at least one of said X axis and said Y axis; and judging means for judging, for each of at least one of (a) an x coordinate and (b) a y coordinate of each of said original sets of x and y coordinates, whether said transformation-function memory stores the transformation function determined for one of said original intervals within which interval said each of said at least one of (a) said x coordinate and (b) said y coordinate falls, wherein when said judging means makes a negative judgment said transformation-function determining means determines the transformation function for said one of said original intervals within which interval said each of said at least one of (a) said x coordinate and (b) said y coordinate falls and said transformation-function memory stores said transformation function determined for said one of said original intervals, and when said judging means makes a positive judgment said second transforming means transforms said each of said at least one of (a) said x coordinate and (b) said y coordinate according to said transformation function determined for said one of said original intervals and stored in said transformation-function memory.

* * * * *